United States Patent [19]
Brady et al.

[11] Patent Number: 6,167,390
[45] Date of Patent: Dec. 26, 2000

[54] FACET CLASSIFICATION NEURAL NETWORK

[75] Inventors: Mark J. Brady, Cottage Grove; Belayneh W. Million, St. Paul; John T. Strand, May Township, all of Minn.

[73] Assignee: 3M Innovative Properties Company, St. Paul, Minn.

[21] Appl. No.: 08/163,825

[22] Filed: Dec. 8, 1993

[51] Int. Cl.[7] .............................. G06F 15/18; G06K 9/62
[52] U.S. Cl. ................................. 706/20; 706/18; 706/26
[58] Field of Search .................... 395/20–25, 27; 382/14–16; 706/20, 18, 26

[56] References Cited

U.S. PATENT DOCUMENTS

| | | | |
|---|---|---|---|
| 3,287,649 | 9/1963 | Rosenblatt | 328/55 |
| 3,950,733 | 4/1976 | Cooper et al. | 340/172.5 |
| 4,044,243 | 8/1977 | Cooper et al. | 235/152 |
| 4,254,474 | 3/1981 | Cooper et al. | 364/900 |
| 4,319,331 | 3/1982 | Elbaum et al. | 364/515 |
| 4,326,259 | 4/1982 | Cooper et al. | 364/715 |
| 4,737,929 | 4/1988 | Denker | 364/807 |
| 4,760,604 | 7/1988 | Cooper et al. | 382/15 |
| 4,897,811 | 1/1990 | Scofield | 364/900 |
| 4,958,375 | 9/1990 | Reilly et al. | 382/14 |
| 5,048,100 | 9/1991 | Kuperstein | 382/36 |
| 5,063,601 | 11/1991 | Hayduk | 382/14 |
| 5,107,442 | 4/1992 | Weideman | 395/11 |
| 5,179,596 | 1/1993 | Weingard | 382/15 |
| 5,239,594 | 8/1993 | Yoda | 382/15 |
| 5,255,348 | 10/1993 | Nenov | 706/20 |
| 5,319,737 | 6/1994 | Reibling et al. | 706/19 |
| 5,359,699 | 10/1994 | Tong et al. | 706/20 |

FOREIGN PATENT DOCUMENTS

| | | | |
|---|---|---|---|
| 0 191 407 | 8/1986 | European Pat. Off. | G06K 9/62 |
| 0 295 876 | 12/1988 | European Pat. Off. | G06K 9/64 |
| 0 559 415 | 9/1993 | European Pat. Off. | G10L 5/06 |
| WO 92/20029 | 11/1992 | WIPO | G06F 15/18 |

OTHER PUBLICATIONS

Hush and Horne, Progress in Supervised Neural Networks, IEEE Signal Processing Magazine, pp. 8–39, Jan. 1993.

Cheu, Ritchie, Recker and Bavarian, Investigation of a Neural Network Model for Freeway Incident Detection, Artificial Intelligence and Civil Engineering, pp. 267–274, 1991.

Lippmann, An Introduction to Computing with Neural Nets, IEEE ASSP Magazine, pp. 4–22, Apr. 1987.

Blumer, Ehrenfeucht, Haussler and Warmuth, Journal of the Association for Computing Machinery, vol. 36, No. 4, pp. 929–965, Oct. 1989.

Redding, Kowalczyk and Downs, Constructive Higher–Order Network Algorithm That Is Polynomial Time, Neural Networks, vol. 6, pp. 997–1010, 1993.

Baum, A Polynomial Time Algorithm That Learns Two Hidden Unit Nets, Neural Computation, vol. 2, No. 4, Winter 1990, pp. 511–522.

Nilsson, Learning Machines, New York, NY: McGraw–Hill, pp. 464–481, 1965.

(List continued on next page.)

*Primary Examiner*—Tariq R. Hafiz
*Assistant Examiner*—George Davis
*Attorney, Agent, or Firm*—Stephen W. Buckingham

[57] ABSTRACT

A classification neural network for piecewise linearly separating an input space to classify input patterns is described. The multilayered neural network comprises an input node, a plurality of difference nodes in a first layer, a minimum node, a plurality of perceptron nodes in a second layer and an output node. In operation, the input node broadcasts the input pattern to all of the difference nodes. The difference nodes, along with the minimum node, identify in which vornoi cell of the piecewise linear separation the input pattern lies. The difference node defining the vornoi cell localizes input pattern to a local coordinate space and sends it to a corresponding perceptron, which produces a class designator for the input pattern.

53 Claims, 11 Drawing Sheets

OTHER PUBLICATIONS

Anderson and Rosenfeld, Neurocomputing, Foundations of Research, Chapters 8, 11, 13, 41 & 42, Massachusetts Institute of Technology, 1988.

Lu, "Pattern classification using self–organizing feature maps"; IJCNN, p. 471–80 vol. 1, Jun. 17–21, 1990.

Baird et al, "A neural network associative memory for handwritten character recognition using multiple chua characters"; IEEE Transactions on Circuits and Systems, p. 667–74, vol. 40, No. 10, Oct. 1993.

Fogel et al, "Evolutionary programming for training neural networks"; IJCNN, p. 601–5, vol. 1, Jun. 17–21, 1990.

FACET CLASSIFICATION NEURAL NETWORK

FIELD OF THE INVENTION

This invention relates generally to adaptive information processing systems, which are also known as neural networks, learning machines, connectionist models, parallel distributed processing models and neuromorphic systems. In particular, this invention is directed to a classification type neural network that performs piecewise linear separation along the entire input space.

BACKGROUND OF THE INVENTION

Neural networks are systems that are deliberately constructed to make use of some of the organizational principles from the human brain. There are at least ten billion neurons, the brain's basic computing elements, in the human brain. Each neuron receives inputs from other cells, integrates the inputs, and generates an output, which it then sends to other neurons. Neurons receive inputs from other neurons by way of structures called synapses and send outputs to other neurons by way of output lines called axons. A single neuron can receive on the order of hundreds or thousands of input lines and may send its output to a similar number of other neurons. One theoretical model of a single neuron will have incoming information at many synapses. At the synapse, the input is assigned a variable synaptic weight, as determined by an associative process. The sum of the weighted inputs is compared to a threshold and if the sum exceeds the threshold, then the neuron fires an action potential, which is sent by way of the neuron's axon. Other variations on this scheme exist in both the biological and computational domains.

Neural networks attempt to mirror the structure of the human brain by using massively parallel interconnection of simple computational elements. This set of connections is often arranged in a connection matrix. The overall behavior of the neural network is determined by the structure and strengths of the connections. If the problem structure is well defined, it is possible to specify the connection strengths beforehand. Otherwise, it is necessary to modify the connection strengths using a learning algorithm, thereby making the system adaptable to changes in the input information. There is often a decoupling between the training phase and the retrieval phase of operation of a network.

In the training phase, the connection strengths and the network are modified. A large number of patterns that are representative of those which the neural network must ultimately classify are chosen as a training set. In supervised learning, the desired classifications of the patterns in the training set are known. The training input vectors are input into the network to produce output responses. The network then measures the actual output response against the predetermined desired output response for the input signal and modifies itself such that the output response would more closely approach the desired output response. After successive training cycles, the network is conditioned to respond uniquely to the particular input signal to provide the desired output signal. Some examples of learning algorithms for perceptron type networks include the Perceptron Convergence Procedure which adapts the synaptic weights based on the error between the desired and actual outputs, and the Least Mean Squares (LMS) solution, a special case of the backpropogation learning algorithm for multilayer perceptrons, which minimizes the mean square error between the desired and actual outputs. After the network has been trained, some novel information, in the form of an input vector or activity pattern, is put into the system. The novel input pattern passes through the connections to other elements, giving rise to an output pattern which contains the conclusions of the system.

There are a number of ways of organizing the computing elements in neural networks. Typically, the elements are arranged in groups or layers of neurons. Single-layer and two-layer systems, with only an input and an output layer, are used extensively. The perceptron, first introduced by Frank Rosenblatt in a multilayered context, see *Principles of Neurodynamics*, New York, Spartan Books (1959), and U.S. Pat. No. 3,287,649 to Rosenblatt, and later distilled down to a single layer analysis by Marvin Minsky & Seymour Papert, see *Perceptrons*, MA, MIT Press (1969) is one learning machine that is potentially capable of complex adaptive behavior. Classifying single layer perceptron 2, as shown in FIG. 1, decides whether an input belongs to one of two classes, denoted class A or class B. N input elements 6, $x_0-x_{N-1}$, are weighted by corresponding weights 8, $w_0-w_{N-1}$, and input to single node 4. Input elements 6 are n-dimensional vectors. Node 4 computes a weighted sum of input elements 6 and subtracts threshold 10, $\theta$, from the weighted sum. The weighted sum is passed through hard limiting nonlinearity, $f_H$, 12 such that output 14, y, is either +1 or 0. Equation 1 represents output 14:

$$y = f_H(\Sigma w_i x_i - \theta) \qquad \text{Equation 1}$$

$$\text{where } y = \begin{matrix} 1 \text{ then Class } A \\ 0 \text{ then Class } B \end{matrix}$$

Rosenblatt's original model of perceptron 2 used a hard limiting nonlinearity 12, where:

$$f_H = \begin{matrix} 1 \text{ when } \Sigma w_i x_i - \theta > 0 \\ 0 \text{ when } \Sigma w_i x_i - \theta \leq 0 \end{matrix}$$

Other nonlinearities may be used, especially in a multilayer perceptron, such as a sigmoid nonlinearity, where:

$$f_S = (1+e^{-\beta \Sigma w_i x_i - \theta})^{-1}$$

The gain of the sigmoid, $\beta$, determines the steepness of the transition region. As the gain gets very large, the sigmoidal nonlinearity approaches a hard limiting nonlinearity. A sigmoidal nonlinearity gives a continuous valued output rather than a binary output produced by the hard limiting nonlinearity. Therefore, while the hard limiting nonlinearity outputs a discrete classification, the sigmoidal nonlinearity outputs a number between 0 and 1, which can be interpreted as a probability that a pattern is in a class.

If single node perceptron 2 is given a set of patterns to classify, such a classification can be learned exactly only if a hyperplane can separate the points. This property is called linear separability. In Equation 1, the input into the hard limiting nonlinearity $f_H$ is a weighted sum of the input elements times the connection strengths. If the sum is greater than threshold $\theta$, $f_H$ takes a value of 1, and y represents Class A. If $f_H$ is less than the threshold, then y takes the value of 0 and represents class B. If there are N inputs into perceptron 2, then all possible inputs to perceptron 2 are represented in N-dimensional space. When the sum of the product of the synaptic weights times the coordinates of the inputs equals the threshold, the equation is that of a hyperplane in the N-dimensional space. In FIG. 2, hyperplane 20, separating all points in Class A from those in Class B in a two dimensional case, is generally represented by Equation 2:

$$x_1 = -w_0/w_1 x_0 + \theta/w_1 \qquad \text{Equation 2}$$

Therefore, if a hyperplane, or line in FIG. 2, can separate the points from the two classes, then the set of input patterns is linearly separable.

Recently, networks that develop appropriate connection strengths in multilayer networks have also been used. Multilayer networks are feed forward networks with one or more layers of nodes between the input and output nodes. Sometimes, the input node is also considered a layer. While single layer perceptrons can only partition an input space into simple decision regions, such as half planes bounded by a hyperplane, it has been recognized that multilayer networks are capable of partitioning an input space into virtually any form of decision regions, thereby allowing the network to generate convex open or closed regions and even arbitrarily complex decision regions, if the network includes more layers. It is therefore important to select a large enough number of nodes to form decision regions that are required for a given concept but not so large such that all the synaptic weights required cannot be reliably ascertained.

When designing a neural network, many design goals must be addressed. First, the learning algorithm for the network ideally is an Occam algorithm with respect to a class of patterns for it to be useful. Generally, an Occam algorithm is defined as an algorithm that makes a network:

1. Consistent
2. Sufficiently small with respect to the complexity of the problem.

Consistency requires that the trained neural network does not misclassify any input patterns. To be sufficiently small with respect to the complexity of the problem, a sufficiently simple model to explain a given concept must be used. "Sufficiently small" has a precise mathematical definition given in *Learnability and the Vapnik-Chervonenkis Dimension*, Anselm Blumer et al., Journal of the Association for Computing Machinery, Vol. 36, No. 4 (1989). If an algorithm is an Occam algorithm, then a class of patterns with a given complexity will be "poly-learnable," that is, the network will learn from a polynomial number of examples, rather than an exponential number of examples. This ensures that the amount of time, the number of examples, the resources necessary or the amount of memory needed to classify a class of patterns is acceptable. As described by Eric B. Baum, *Polynomial Time Algorithm That Learns Two Hidden Unit Nets*, (1990):

[A] class C of boolean functions is called learnable if there is an algorithm A and a polynomial p such that for every n, for every probability distribution D on $R^n$, for every $c \in C$, for every $0 < \epsilon, \delta < 1$, A calls examples and with probability at least $1-\delta$ supplies in time bounded by $p(n, s, \epsilon^{-1}, \delta^{-1})$ a function g such that $$\text{Prob}_{x \in D}[c(x) \neq g(x)] < \epsilon$$

Here s is the "size" of c, that is, the number of bits necessary to encode c in some "reasonable" encoding.

This model thus allows the algorithm A to see classified examples drawn from some natural distribution and requires that A output a hypothesis function which with high confidence $(1-\delta)$ will make no more than a fraction $\epsilon$ of errors on test examples drawn from the same natural distribution.

The Baum article ensures that the amount of time and number of examples necessary to learn a model within a target error, $\epsilon$, will be acceptable.

Another set of design goals that must be addressed when designing a neural network and its learning algorithm is to make the learning algorithm constructive and to appropriately prune the size of the neural network. To be constructive, a learning algorithm does not decide beforehand on the size of the required network for a particular problem, but rather "grows" the network as necessary. While constructive algorithms "grow" the network as needed, most do not ensure that the resulting network will be minimal. The Occam principle raises evidence that using a network that is larger than necessary can adversely affect the network's ability to generalize. Therefore, pruning the network after learning has taken place to reduce the size of the network is desirable.

When building a neural network, a local or a global model can be built. In a local model, the synaptic weights, which define the particulars of the model during the learning phase, pertain to localized regions of the input space. In a global model, on the other hand, the weights are used to classify a large portion of the input space, or in some cases, the entire input space. The advantage to a local model is that the information implicit in the weights is applied to the classification only where appropriate, thereby avoiding over generalizations of local features. The advantage of a global model is that a small amount of information can, at times, be used to classify large areas of input space. A local-global model combines the advantages of each, looking at local features when appropriate, but also classifying large areas in the input space when possible. Therefore, what is desirable in a learning algorithm is to have both global properties, wherein a small model is used for large, uniform input regions and local properties, wherein the network can learn details without unlearning correct aspects of the model.

A nearest neighbor pattern classifier can be used to classify linearly separable data sets, among others. A nearest neighbor type classifier has both global and local properties. FIG. 3 shows a linear decision surface classifying patterns of opposite types to build a model out of input patterns. Class A pattern 32 and class B pattern 34 could be a pair of examples or clusters of data that are linearly separable. Decision surface 30 classifies patterns 32 and 34 using a nearest neighbor type classification. If patterns 32 and 34 are a pair of examples of opposite types or classes, line 36 is drawn between the data of a first type, such as class A pattern 32, and its nearest neighbor of the opposite type, such as class B pattern 34. Decision surface 30 bisects line 36 to create two regions of classification in the model. Thus, the nearest neighbor of the opposite type classification of FIG. 3 essentially reduces the problem to a two point problem. A nearest neighbor type classifier has global properties because a small number of classification regions can fill the entire space as well as local properties because classification regions may be made more local by the bounding effects of neighboring regions. The drawback to nearest neighbor type classifiers is that they contain no provision for reducing the size of the model. All the examples input during the training cycle are stored and become part of the model. Since the network size is not minimized, the size of the network can adversely affect the ability of the network to generalize. Further, if many pairs of samples of opposite type exist, the nearest neighbor type classifier, for two sample or two cluster discrimination, cannot perform multiple linear separations necessary to sufficiently partition the input space.

SUMMARY OF THE INVENTION

To overcome the limitations in the prior art described above, and to overcome other limitations that will become apparent upon reading and understanding the present specification, the present invention provides a classification neural network for classifying input patterns. The neural network is a multilayered neural network, having an input node an output node and two layers. The domain layer is comprised of a plurality of difference nodes. The difference nodes, along with a minimum node, identify in which localized domain the input pattern lies and transform the input pattern to the localized domain. The classifying layer is comprised of a plurality of perceptron nodes. The perceptron node corresponding to the difference node that transformed the input pattern to the localized domain associated with the difference node produces a class designator for the input pattern. The class designator is then output at the output node.

The synaptic weights for the neural network of the present invention are determined by first providing samples and their correct classifications. Candidate posts are established for each sample point, each candidate point comprising the sample point, its nearest neighbor of opposite type, a midpoint vector, a normal vector, and in a preferred embodiment, a facet origin vector. The facet origin vector is adjusted to correctly classify all sample points that are closer to the midpoint vector of the candidate post than the nearest neighbor of opposite type of the sample point of the candidate post. The network is then pruned to establish a final post set. The components of the midpoint vectors from the final post set are assigned to corresponding difference nodes as synaptic weights. The components of the normal vectors from the final post set are assigned to corresponding perceptron nodes as synaptic weights. In the preferred embodiment, the facet origin vector is also stored in corresponding difference nodes.

To prune the size of the neural network, a popularity sphere centered at each midpoint vector is defined with a radius equal to the distance from the midpoint vector to the first sample point misclassified by the midpoint vector. The popularity of the candidate post associated with the midpoint vector is then determined by counting the number of correctly classified samples within the popularity sphere. Proxy spheres are centered around each sample point with a radius equal to the distance from the sample point to the first midpoint vector that misclassifies the sample point. A proxy post is chosen for each sample point, the proxy post being a candidate post within the proxy sphere of the sample point and having the highest popularity. Candidate posts are eliminated that are not proxy posts. The process is repeated until no more candidate posts are eliminated and the remaining candidate posts make up the final post set.

In operation, the input node of the neural network broadcasts the input pattern to all the difference nodes. Each difference node computes a difference between the input pattern and the midpoint vector associated with the difference node. The minimum node identifies the difference node with the minimum difference, thereby determining in which localized domain associated with each difference node the input pattern lies. The difference node with the minimum difference localizes the input pattern to a local coordinate space and sends it to a corresponding perceptron, which produces a class designator for the input pattern.

BRIEF DESCRIPTION OF THE DRAWINGS

The present invention will be more fully described with reference to the accompanying drawings wherein like reference numerals identify corresponding components, and.

DETAILED DESCRIPTION OF THE PREFERRED EMBODIMENT

In the following detailed description of the preferred embodiment, reference is made to the accompanying drawings which form a part hereof, and in which is shown by way of illustration of a specific embodiment of which the invention may be practiced. It is to be understood that other embodiments may be utilized and structural changes may be made without departing from the scope of the present invention.

The neural network of the present invention must be trained to correctly classify inputs. The classifying type network takes as its input a set of training examples indicative of inputs that the network will later classify and the training examples' correct classifications. The goal of training the neural network is to determine the number of "posts," or pairs of nodes needed in the neural network and produce synaptic weights for the two-layered network of the present invention. In a preferred embodiment, a third node type is included in the first layer. Two assumptions must be made when training the network:

1. The problem of building a network to classify inputs in the given space is well posed. "Well posed" means that the classification of all possible inputs will partition the input space into two open sets which share a boundary. The boundary may be described as a hypersurface.
2. While it is recognized that only the simplest classifications are linearly separable, all well posed problems are approximately piecewise linearly separable.

The first step in training the network is acquiring N sample points and their correct classifications:

$S = \{(X_i, C_i) | i = 1 \ldots N, C_i = A \text{ or } B\}$, the set of classified samples, A≡{$X_i|C_i$=A}, the set of all samples having type A, and
B≡{$X_i|C_i$=B}, the set of all samples having type B, where $X_i$ is a vector describing the sample in input space and $C_i$ is the predefined class descriptor, either class A or class B.

Figure 1:
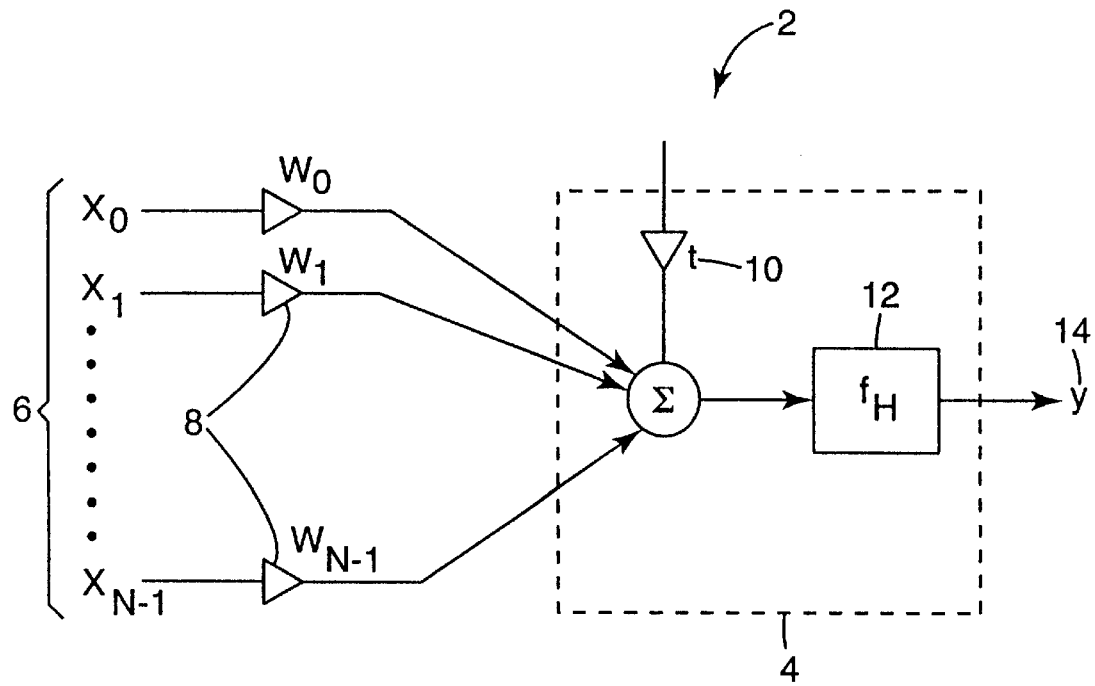
FIG. 1 shows a schematic diagram of a classifying single layer perceptron.
Figure 2:
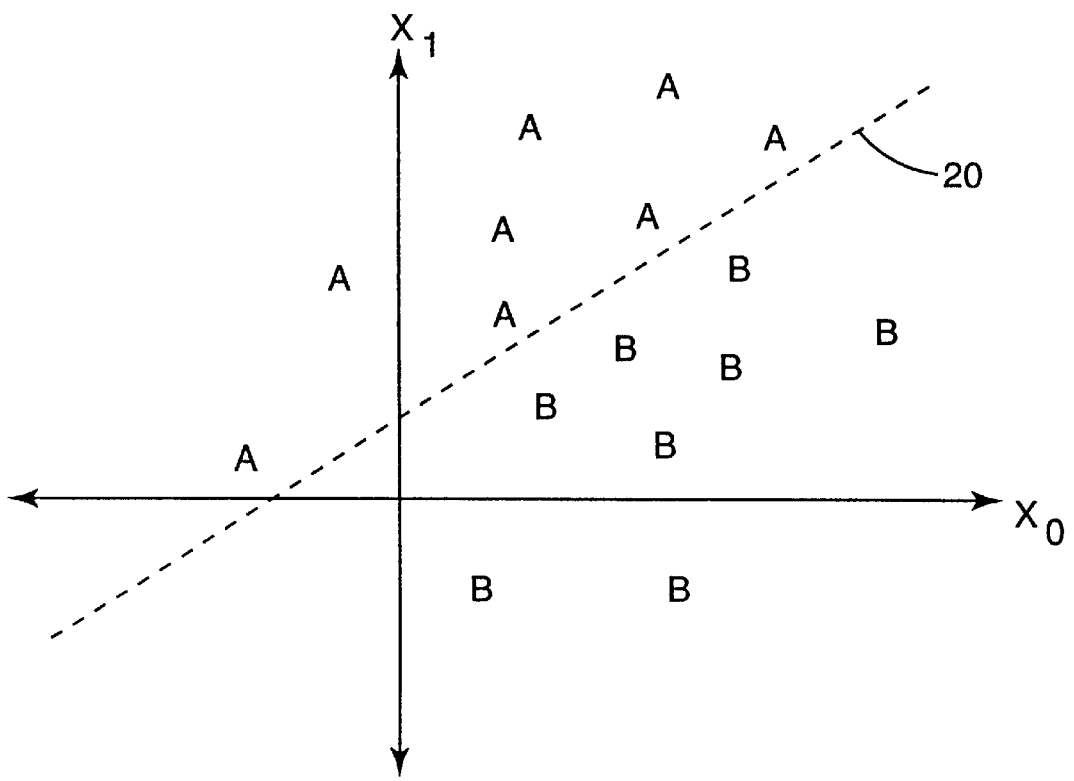
FIG. 2 shows a partitioning hypersurface separating sample points of two classes in two-dimensional space.
Figure 3:
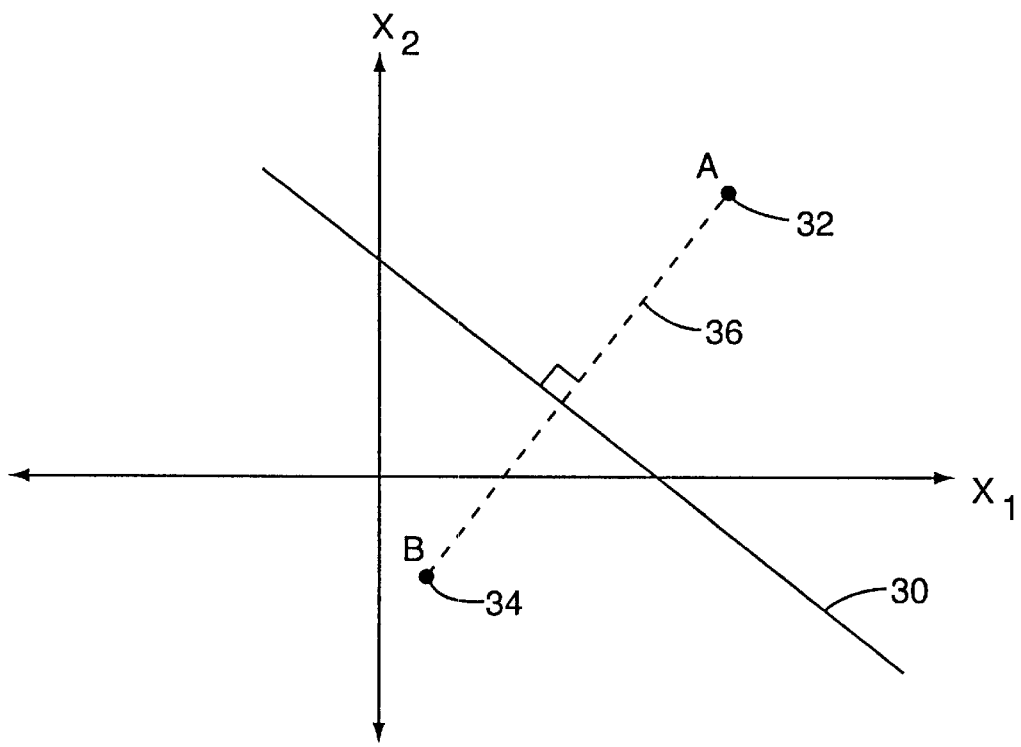
FIG. 3 shows a linear decision surface of a nearest neighbor type classifier for creating regions of classification for two sample or two cluster discrimination.
Figure 4:
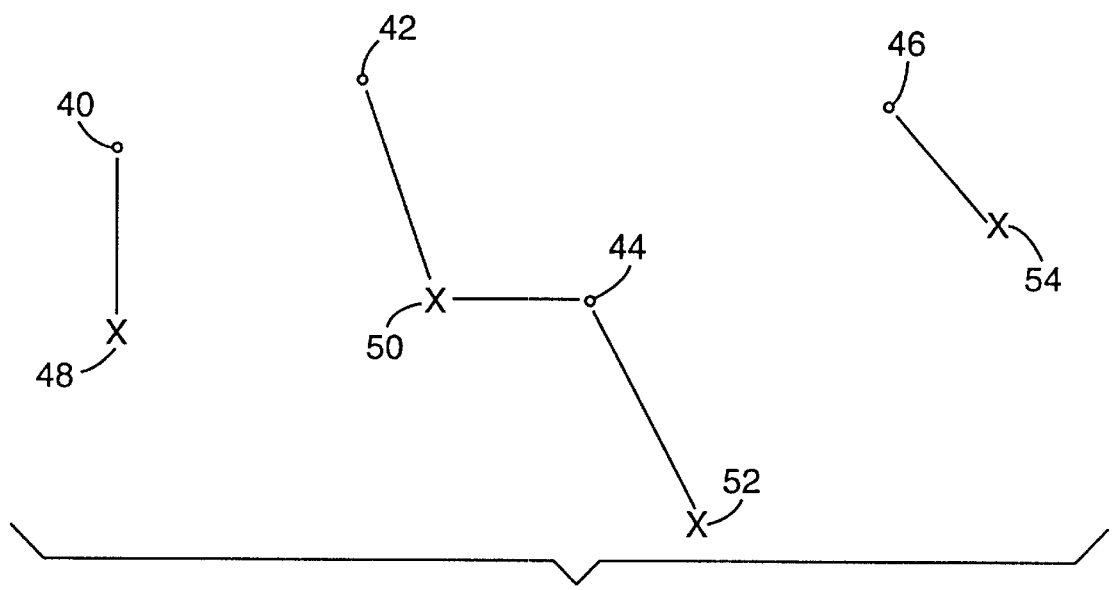
FIG. 4 shows sample points of two classes and the nearest neighbor of opposite type of each sample point.

After all N sample points have been acquired, for each sample point, the nearest neighbor of opposite type is determined. More specifically, for each ($X_a$, $C_a$)∈S, find ($X_b$, $C_b$) such that $C_a \neq C_b$ and $|X_a-X_b| \leq |X_a-X_k|$ for all k where $C_a \neq C_k$. As shown in FIG. 4, sample points of class A 40, 42, 44 and 46 have nearest neighbor of opposite type, class B points 48, 50, 50 and 54 respectively. Conversely, sample points of class B 48, 50, 52 and 54 have nearest neighbor of opposite type, class A points 40, 44, 44, 46 respectively. As seen in FIG. 4, it is not necessary for a class A sample's nearest neighbor of opposite type to have the same class A point to be it's nearest neighbor of opposite type. For example, class A point 42 has nearest neighbor of opposite type as class B point 50 whereas class B point 50 has nearest neighbor of opposite type as class A point 44. Also, it is possible for a point to be the nearest neighbor of opposite type to more than one point. For example, class B point 50 is nearest neighbor to both class A points 42 and 44. While this step of training the network is the same as using a nearest neighbor algorithm, the network will not store any examples from training, as will later be described, as nearest neighbor algorithms do. The elements in each pair are ordered [($X_a$, $C_a$), ($X_b$, $C_b$)] such that the first element is a class A pair and the second element is a class B pair. All redundant elements are removed to make each nearest neighbor of opposite type pair unique.

Figure 5:
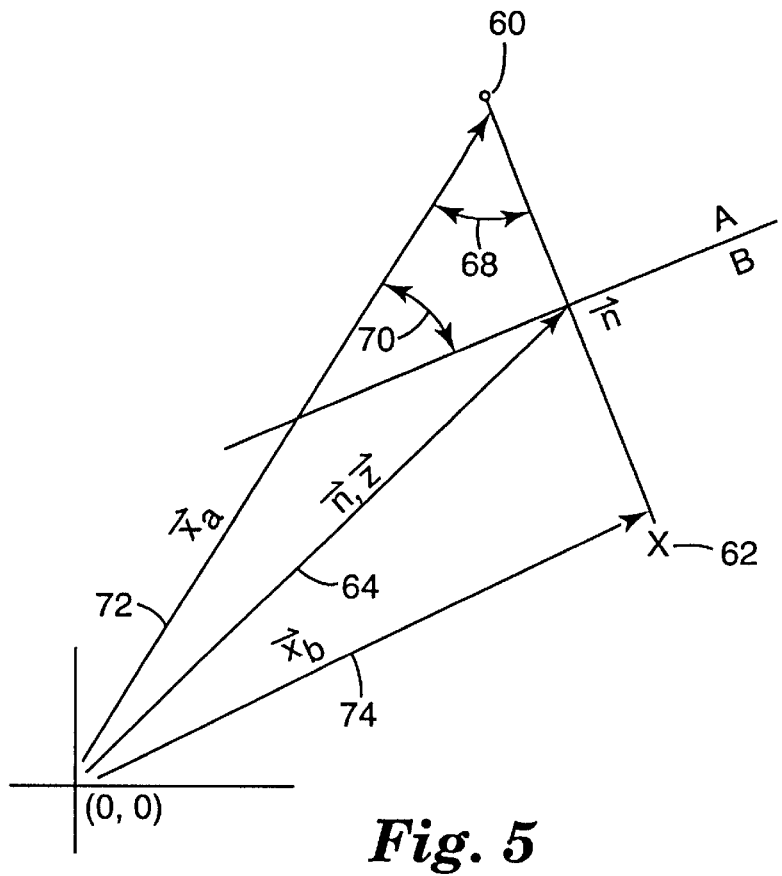
FIG. 5 shows the relationships of the components that make up a candidate post, the two sample points, the post midpoint vector, the post normal vector and the facet origin vector.

Once the nearest neighbor of opposite type have been determined, candidate posts are established for the training examples. The set of established candidate posts will later be reduced to a final set of posts used to determine the number of nodes needed in the neural network as well as to provide the synaptic weights for the neural network. In a preferred embodiment, each post is represented by three vectors having a dimensionality equal to that of the input space. One vector is called the post midpoint, another the post normal and the third the facet origin. In another embodiment, each post is represented by only the post midpoint and the post normal. Referring to FIG. 5, a pair of points in the input space, class A point 60, represented by vector $x_a$ 72, and class B point 62, represented by vector $X_b$ 74, are nearest neighbors of opposite type. Post midpoint vector m 64 represents the midpoint on nearest neighbor line 68 connecting points 60 and 62. Post normal vector n 66 represents a direction perpendicular to partitioning hyperplane 70, in FIG. 5, a line. Post normal vector n 66 points in a direction of a predetermined class, either class A or class B. In FIG. 5, all points falling on the side of partitioning hyperplane 70 in which post normal vector 66 points are classified as being of B class. A third vector, z, represents a facet origin and is initially set equal to post midpoint vector m. Post midpoint vector m and post normal vector n can be represented as follows:

$$z = m \equiv \frac{(x_a + x_b)}{2}$$

$$n \equiv \frac{(x_a - x_b)}{|x_a - x_b|}$$

Therefore, each candidate post is defined as a set of 5-tuples:

$$C \equiv \{(X_a, X_b, n, z, m)\}$$

comprising the sample points from each pair in a candidate post with their corresponding normals, facet origins and midpoints.

Figure 6:
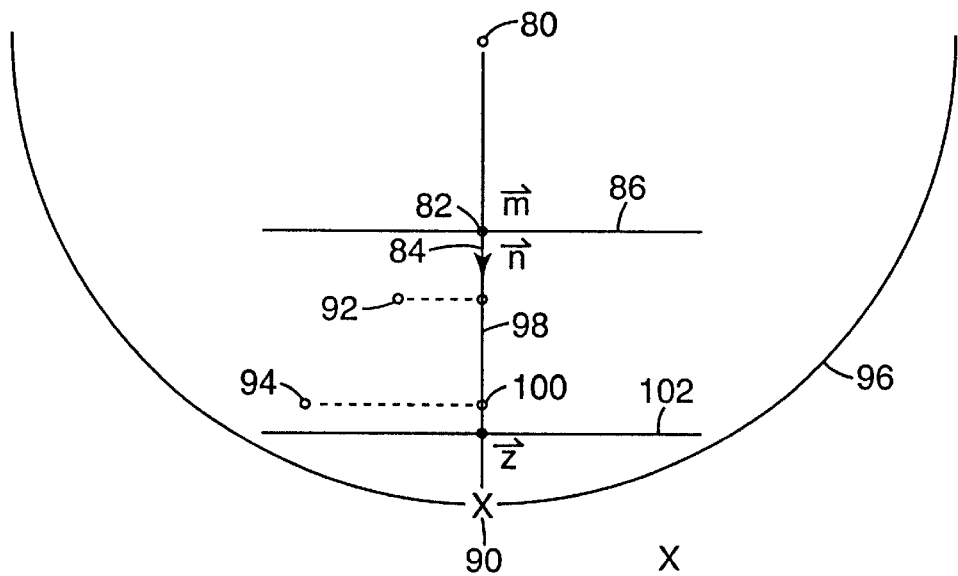
FIG. 6 shows the adjustment of the facet origin vector in a first embodiment of the invention.

One desirable property of a neural network is that it provides consistent classifications. Referring to FIG. 6, class A point 80 has a post midpoint m 82 and post normal n 84. The location of post midpoint 82 is determined by the nearest neighbor of opposite class of class A point 80, which is class B point 90. In FIG. 6, post normal 84 is directed towards points that will fall on the class B side of partitioning hyperplane 86. As further seen in FIG. 6, class A points 92 and 94 will be misclassified by post midpoint 82 and post normal 84 of class A point 80. Class A points 92 and 94 both fall on the class B side of partitioning hyperplane 86. Therefore, it is necessary to correct the misclassifications to ensure consistency.

In a first embodiment of the present invention, facet origin z of class A point 80 is initially defined as located in the same position as post midpoint m 82. When misclassifications occur such as in FIG. 6, there is a need to adjust facet origin z such that the candidate post associated with class A point 80 produces correct classifications. For each $X_a$ and its nearest neighbor of opposite type $X_b$, and visa versa, at least one of the two following uniform balls having the same radius, $X_a - X_b$, exists:

$$G_a \equiv \{x | |x - x_a| \leq |x_a - x_b|\}$$

$$G_b \equiv \{x | |x - x_b| \leq |x_a - x_b|\}$$

or in other words:

$G_a$=Uniform ball around $X_a$ with $X_b$ as nearest neighbor of opposite type $G_b$=Uniform ball around $X_b$ with $X_a$ as nearest neighbor of opposite type A uniform ball is a sphere with a center at sample point $X_a$ or $X_b$. The radius of the uniform ball will be equal to the distance from sample point $X_a$ or $X_b$ to its nearest neighbor of opposite type. Therefore, the uniform ball of a sample point will not have any points inside it of the opposite type of the sample point.

If a uniform ball exists for both $X_a$ and $X_b$, that is $X_a$ is the nearest neighbor of opposite type of $X_b$ and $X_b$ is the nearest neighbor of opposite type of $X_a$, then facet origin z need not be moved. If a uniform ball exists only for one of the sample points, however, facet origin z must be moved. If the uniform ball $G_a$ exists around $X_a$, that is $X_b$ is the nearest neighbor of opposite type of $X_a$ but $X_a$ is not the nearest neighbor of opposite type of $X_b$, then s is defined as:

$$s \equiv \min\{(X-X_b) \cdot n | X \in G_a\}$$

and move facet origin z to:

$$z \equiv x_b + \frac{s}{2}n$$

If the uniform ball $G_b$ exists around $X_b$, that is $X_a$ is the nearest neighbor of opposite type of $X_b$ but $X_b$ is not the nearest neighbor of opposite type of $X_a$, then s is defined as:

$$s \equiv \min\{(X_a - X) \cdot n | X \in G_b\}$$

and move facet origin z to:

$$z \equiv x_a - \frac{s}{2}n$$

Thus, s is a locator for the most peripherally projected point in the uniform ball. Once s is determined for a particular sample point, facet origin z is placed a distance of ½s from the sample point's nearest neighbor of opposite type along the line connecting the two points. Once facet origin z is moved, it acts as the origin for the new partitioning hyperplane for the sample point.

Referring again to FIG. 6, uniform ball $G_a$ 96 exists around class A point $X_a$ 80. The radius of uniform ball 96 is equal to the distance between class A point 80 and its nearest neighbor of opposite type, class B point 90. All similarly classified points, namely class A points 92 and 94, are projected onto line 98 connecting class A point $X_a$ 80 and class B point 90. To project the points onto line 98, the dot product between post normal 84 and the vector associated with the difference between point 92 and class B point 90 is taken. Once all similarly classified points are projected onto line 98, facet origin z is moved to a position halfway between class B point 90 and the projected point closest the class A point's 80 nearest neighbor of opposite type, class B point 90. In FIG. 6, the most peripherally projected point in the uniform ball is projected point 100 and s equals the distance between projected point 100 and class B point 90. Facet origin z is then moved to the midpoint between projected point 100, and class B point 90, and acts as the origin for partitioning hyperplane 86. Partitioning hyperplane 102 now correctly classifies class A points 92 and 94.

There are two types of facets involved in the piecewise linear separation of the input space. Vornoi boundaries are facets, and are generated by the locations of midpoints m of the final post set. Vornoi boundaries are bounded hypersurfaces that are a set of points equidistant from any of the generators of the cells, the midpoints m. The vornoi boundaries surrounding a midpoint m form a vornoi cell, which is an n-dimensional polygon, or a polytope, with midpoint m defining the cell. Bounds occur where multiple vornoi boundaries intersect. For example, in 3-dimensional space, facets are planes and their intersections are edges. Thus, the vornoi boundaries piecewise linearly separate the midpoints m, as opposed to linearly separating the sample points, in a nearest neighbor type fashion thereby piecewise linearly separating the entire input space by a vornoi tesselation. Further, each vornoi cell may be partitioned by a partitioning bounded hypersurface, which is also a facet. The partitioned polytope, a partitioned vornoi cell, forms two subpolytopes, each subpolytope defining space of a different classification. The partitioning hypersurface is defined by facet origin z and the orientation of the facet defined by n. It can be seen that the present method of partitioning of the input space is different than a nearest neighbor function because rather than storing all examples, the boundaries, or facets are stored. Also, rather than the sample points and their nearest neighbor determining the facet locations, the post midpoints m and their nearest neighbor determine the facet locations.

The following proof shows that the above method of determining the location of facets, leads to a consistent neural network, one of the requirements to be Occam:

It can be shown that the synaptic weight determination method is consistent.
Proof:

By section 3, the network which may be generated using candidate posts defined after Z adjustment and before candidate competition is consistent. It remains to show that the process of candidate competition preserves consistency. To see that this is the case, note that for each sample the corresponding proxy is chosen such that no other candidate which is closer to the sample will misclassify it. Therefore, if some other candidate is chosen as a proxy for some other sample point, and if that proxy is closer to the original sample than its own proxy, the new proxy will also correctly classify the original sample. Hence, the closest post, as determined by M, correctly classifies each sample. This is all that is required for consistency of the network.

Section 3:

In the synaptic weight determination method, following the adjustment of the Z vectors, a network formed using the candidate posts as weights is consistent.
Proof:

A sample will always be correctly classified by its own post. Therefore, for misclassification to occur, a sample must be closer to the M point of another post and that other post must misclassify the sample. Such potential situations may be broken down into two cases.

Case 1) The Uniform Balls of $P_j$ and $R_k$ are of the Same Type

Let $P_j$ be the post which potentially misclassifies sample $R_k$. Both $P_j$ and $R_k$ have associated with them a uniform ball. If these uniform balls are of the same type, then by section 1 $R_k$ is in the uniform ball of $P_j$. Since the $Z_j$ vector of $P_j$ has been adjusted to ensure that all points in $P_j$'s uniform ball are properly classified, $R_k$ is properly classified.

Case 2) The Uniform Balls of $P_j$ and $R_k$ are of Different Types

By section 2 $R_k$ cannot be closer to $M_j$ than it is to $M_k$. Therefore there can be no misclassification.

Since, in both cases there is no misclassification, the network is consistent.

Section 1

Let $(R_k, B_k, M_k, N_k, Z_k)$ and $(R_j, B_j, M_j, N_j, Z_j)$ be candidate posts, where $R_k$ and $B_k$ are sample points of different classes, $M_k$ is the post midpoint vector associated with the sample points, $N_k$ is the post normal vector, and $Z_k$ is the facet origin. If $R_k$ has a uniform ball and if $R_k$ is closer to $M_j$ than it is to $M_k$, and if $R_j$ has a uniform ball, then $R_k$ is in the uniform ball of $R_j$.

Proof by contradiction: Let $R_j \equiv (X_{R,j,i}, \ldots, X_{R,j,n})$. Likewise for $R_k$, $B_k$, and $B_j$. Let $r \equiv |R_k - B_k|$.

*) Assume that $R_k$ is closer to $M_j$ than it is to $M_k$ and $R_k$ is not in the uniform ball of $R_j$.

By the definition of a midpoint, $$X_{M,j,i} = (X_{R,j,i} + X_{B,j,i})/2 \qquad 1)$$

Without loss of generality, one may place $R_k$ at the origin. $R_k$ is closer to $M_j$ than it is to $M_k$ may be expressed as:

$$2) \quad \sqrt{\sum_i x_{M,j,i}^2} < r/2 \text{ or } \sum_i x_{M,j,i}^2 < r^2/4$$

By the definition of "uniform ball":

$$3) \quad \sqrt{\sum_i x_{B,j,i}^2} > r \text{ or } \sum_i x_{B,j,i}^2 > r^2$$

$R_k$ is not in the uniform ball of $R_j$ can be written as:

$$4) \quad \sqrt{\sum_i x_{R,j,i}^2} >$$

$$\sqrt{\sum_i (x_{R,j,i} - x_{B,j,i})^2} \text{ or } \sum_i x_{R,j,i}^2 > \sum_i (x_{R,j,i} - x_{B,j,i})^2$$

Combining (1) & (2) gives:

$$5) \sum_i [(x_{R,j,i} + x_{B,j,i})/2]^2 < r^2/4 \text{ or } \sum_i [(x_{R,j,i} + x_{B,j,i})]^2 < r^2$$

Expanding (4) & (5):

$$6) \sum_i x_{R,j,i}^2 > \sum_i (x_{R,j,i}^2 - 2x_{R,j,i}x_{B,j,i} + x_{B,j,i}^2)$$

$$7) \sum_i [x_{R,j,i}^2 + 2x_{R,j,i}x_{B,j,i} + x_{B,j,i}^2] < r^2$$

Add (3) to (6):

$$8) \sum_i (x_{R,j,i}^2 + x_{B,j,i}^2) > r^2 + \sum_i (x_{R,j,i}^2 - 2x_{R,j,i}x_{B,j,i} + x_{B,j,i}^2)$$

Which implies:

$$9) \sum_i 2x_{R,j,i}x_{B,j,i} > r^2$$

Using (3), (9), and the fact that $X_{R,j,i}^2$ is positive, one has:

$$10) \sum_i [x_{R,j,i}^2 + 2x_{R,j,i}x_{B,j,i} + x_{B,j,i}^2] > r^2$$

which contradicts (7). Therefore, statement (*) must be false.

Section 2:

Let $(R_k, B_k, M_k, N_k, Z_k)$ and $(R_j, B_j, M_j, N_j, Z_j)$ be candidate posts. If $R_k$ has a uniform ball and if $B_j$ has a uniform ball, then $R_k$ cannot be closer to $M_j$ than it is to $M_k$.

Proof by Contradiction:

The radius of $R_k$'s uniform ball must be less than $|R_k - B_j|$. Likewise for $B_j$'s uniform ball. By the definition of midpoint, $M_k$ is on the sphere centered at $R_k$ and of radius $|R_k - B_j|/2$. Call the interior of this sphere B. If $R_k$ is closer to $M_j$ than it is to $M_k$ then $M_j$ must be in the ball B. However, $M_j$ in B implies $|B_j - R_j| > |R_k - B_j|$. This would, in turn, imply that $R_k$ is in the uniform ball of $B_j$. Since this is impossible, $R_k$ must not be closer to $M_j$ than it is to $M_k$.

Figure 7:
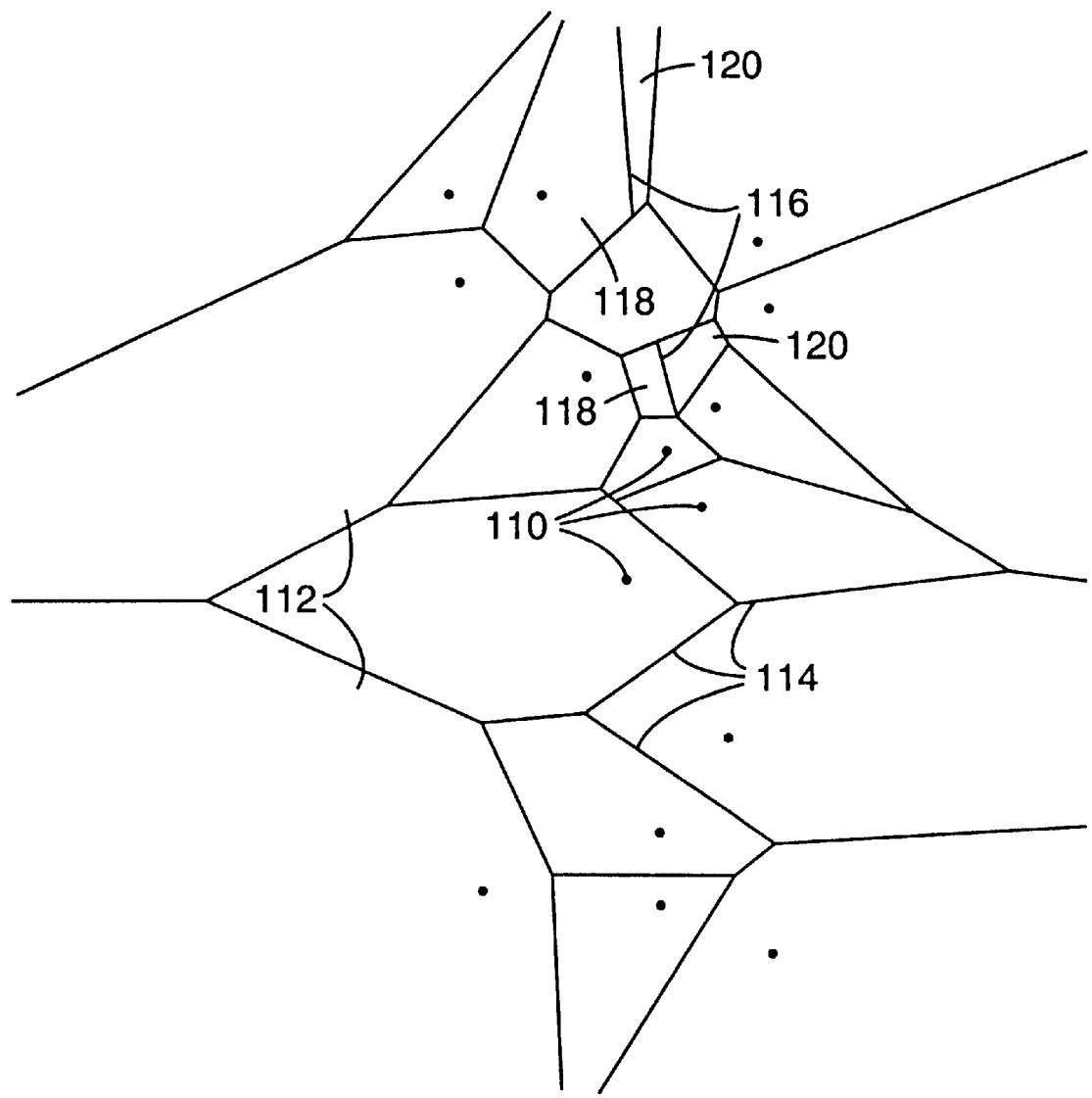
FIG. 7 shows a piecewise linear separation of a two-dimensional input space resulting in a vornoi tesselation defined by the post midpoint vectors.

FIG. 7 shows a portion of a two-dimensional input space that is piecewise linear separated by a vornoi tesselation. Midpoints m 110 define vornoi cells 112. Each vornoi cell 112 is separated by vornoi boundaries 114, or facets, and is a polytope, or in two dimensions, a polygon. Facet origin z and post normal n, not shown, define the location of partitioning hyperplanes 116, which in two dimensions are lines. Each partitioning hyperplane 116, also a facet, partitions vornoi cell 112 into two subpolytopes 118 and 120. If z moves off so far that it is outside a vornoi cell, then the vornoi cell is left to be only one class. For example, as seen in FIG. 7, cell 122 is only of class A points while cell 124 is only of class B points.

Figure 7A:
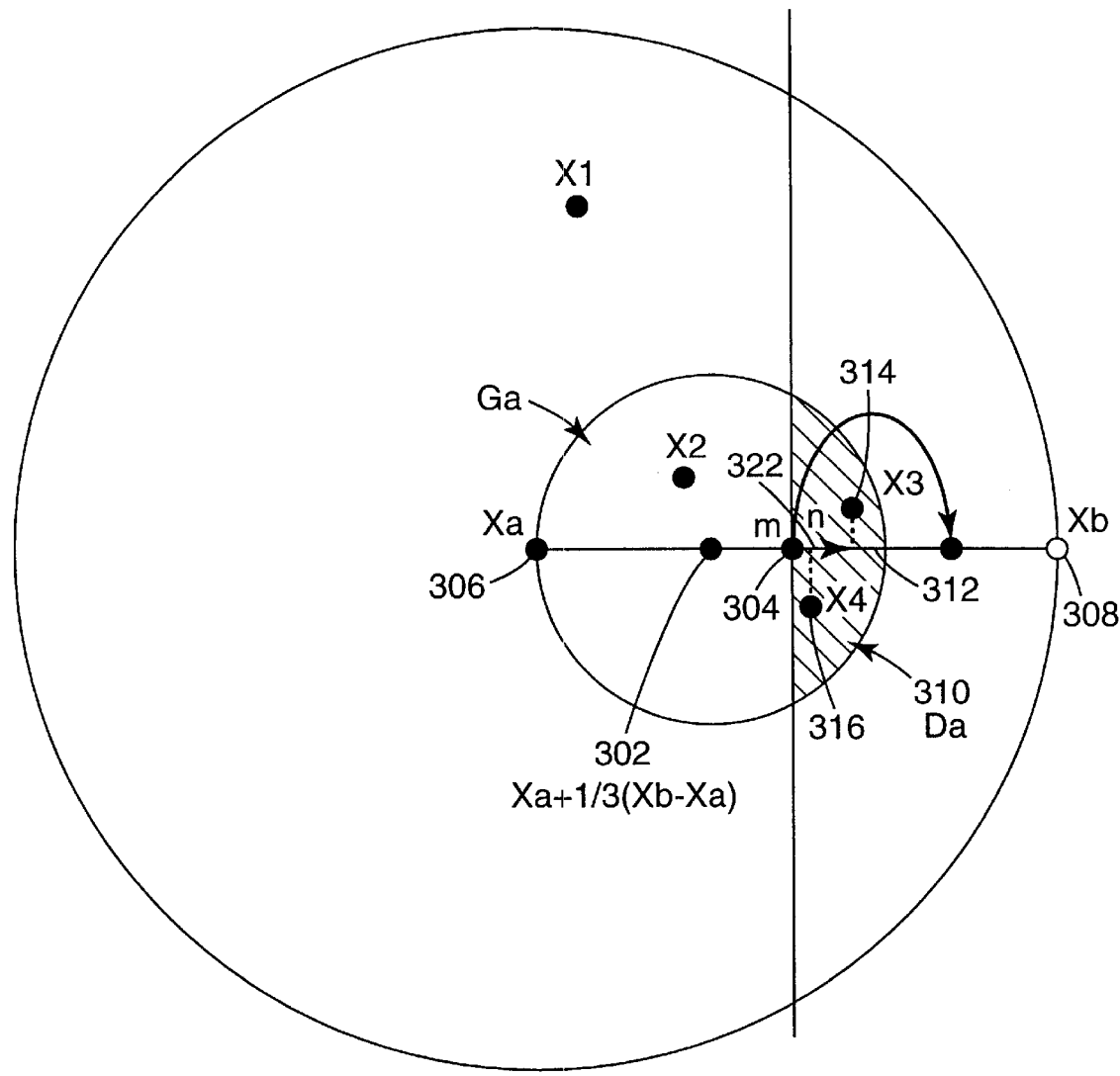
FIG. 7a shows the adjustment of the post midpoint vector in a second embodiment of the invention.

In another embodiment of the present invention, no facet origin z is necessary when determining the candidate posts and each candidate post is defined as a set of 4-tuples:

$$C = \{(X_a, X_b, n, m)\}$$

comprising the sample points from each pair in a candidate post with their corresponding normals, and midpoints. Each candidate post has two uniform balls, $G_a$ and $G_b$, one surrounding each sample $X_a$ and $X_b$, respectively. Referring to FIG. 7a, uniform ball $G_a$ 300 is centered at $X_a + \frac{1}{3}(X_b - X_a)$ 302 and has a radius of $|\frac{1}{3}(X_b - X_a)|$. Uniform ball $G_a$ is a sphere containing exactly the points which are classified by post midpoint m 304 associated with $X_a$ 306 and $X_b$ 308 rather by their own post midpoints. The uniform balls in this embodiment of the invention differs from the first embodiment because they define exactly the points that are classified by post midpoint m 304 rather than all points that could be classified by post midpoint m 304. Two half spaces are also defined as follows:

$$H_a \equiv \{x | (x-m) \cdot n \geq 0\}$$

$$H_b \equiv \{x | (x-m) \cdot n \leq 0\}$$

$H_a$ 318 are those points that are classified as type A by post normal n 322 and $H_b$ 320 are those points that are classified as type B by post normal n 322. If the set:

$$D_a = A \cap G_a \cap H_b$$

is non-empty, then s is defined as:

$$s = \min\{(x - x_b) \cdot n | x \in D_a\}$$

When $D_a$ 310 is non-empty, it represents the set of points that are misclassified by post midpoint m 304. Then, misclassifed points $X_4$ 314 and $X_5$ 316 are projected onto line 312, rather than projecting all points onto the line, as in the first embodiment. In this embodiment of the invention, since no facet origin z exists, post midpoint m 304 is moved to:

$$m = x_b + \frac{s}{2}n$$

Thus, post midpoint m 304 is moved halfway between the most peripherally projected point and $X_b$ 308.

On the other hand, if the set:

$$D_a = B \cap G_b \cap H_a$$

is non-empty, then s is defined as:

$$s = \min\{(x - x_a) \cdot n | x \in D_b\}$$

and post midpoint m is moved to:

$$m = x_a + \frac{s}{2}n$$

Once the candidate posts have been determined, all candidate posts compete to be included in the final post set. This eliminates redundant candidate posts as well as the least accurate approximations, thereby pruning the size of the network, a second requirement of being Occam. To prune the network, the popularity of each candidate post is calculated. The popularity of a candidate post is equal to the number of samples in the largest popularity ball centered at a post midpoint m of a candidate post such that no sample in the popularity ball is incorrectly classified. The larger the popularity ball, the more global the post will be. Samples beyond the first misclassification that are correctly classified could be correctly classified merely because of coincidence and not because of the domain of influence of the candidate post. Therefore, once a popularity ball misclassifies a sample, popularity is determined to limit the globalness the post. A candidate post classifies a point x as being a class A point or a class B point as follows:

If (x−m)·n>0, then x is classified as being in class A;
If (x−m)·n≦0, then x is classified as being in class B.
As will be seen, classifying x as being in class A (or class B) does not necessarily imply that x must actually be in class A (or class B).

Figure 8:
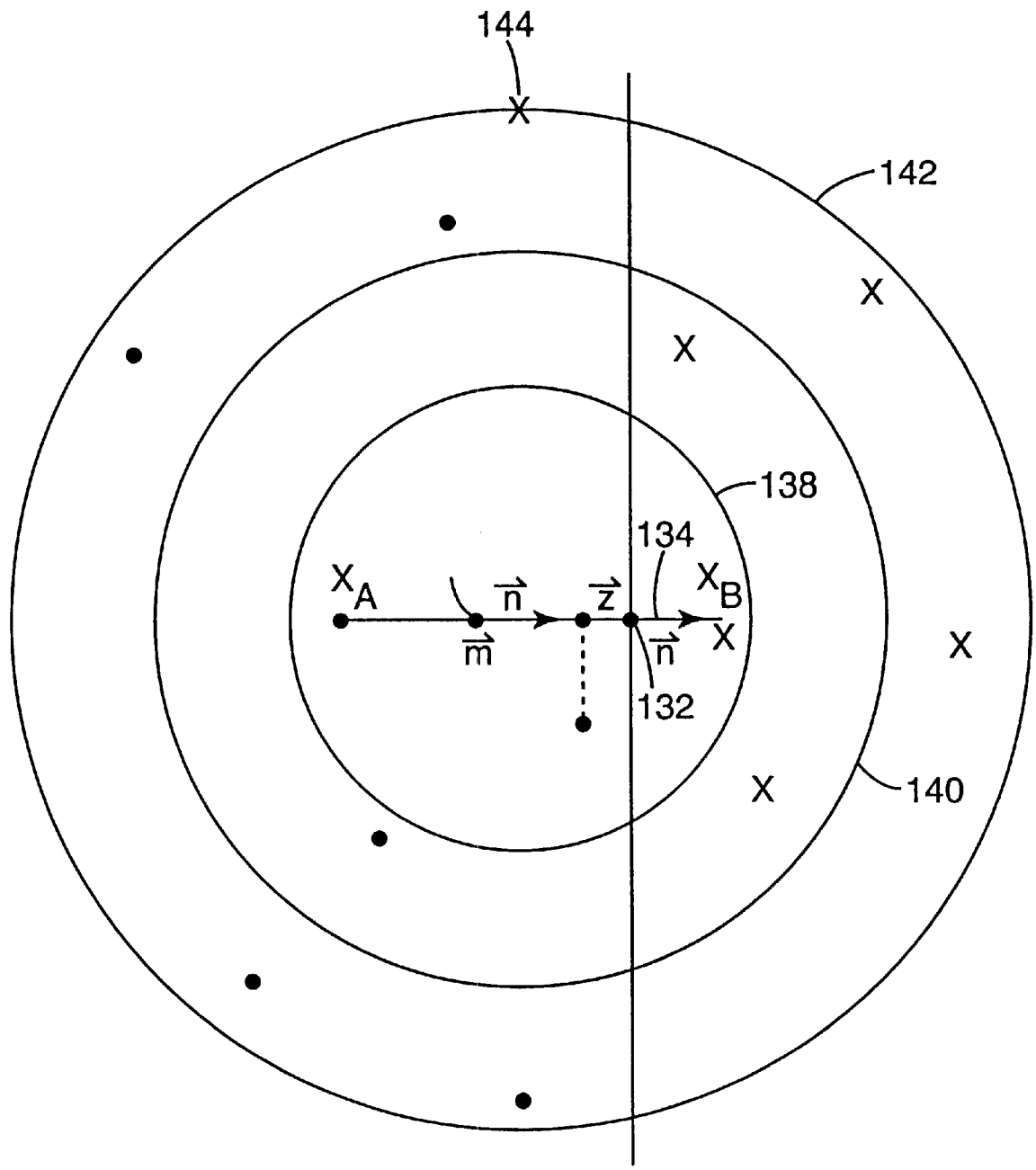
FIG. 8 is used to describe the determination of popularity of a candidate post.

In FIG. 8, partitioning hyperplane 130 is defined by facet origin z 132 and post normal n 134 associated with post midpoint m 136. At popularity ball 138, all class A points and class B points are correctly classified by partitioning hyperplane 130. Similarly, at popularity ball 140, no sample in popularity ball 140 is incorrectly classified. At popularity ball 142, however, sample 144 is misclassified by partitioning hyperplane 130. Thus, popularity ball 142 is the largest popularity ball centered at m that does not misclassify any samples. The popularity of popularity ball 142 is equal to the number of samples that are correctly classified by ball 142, or thirteen.

Figure 9:
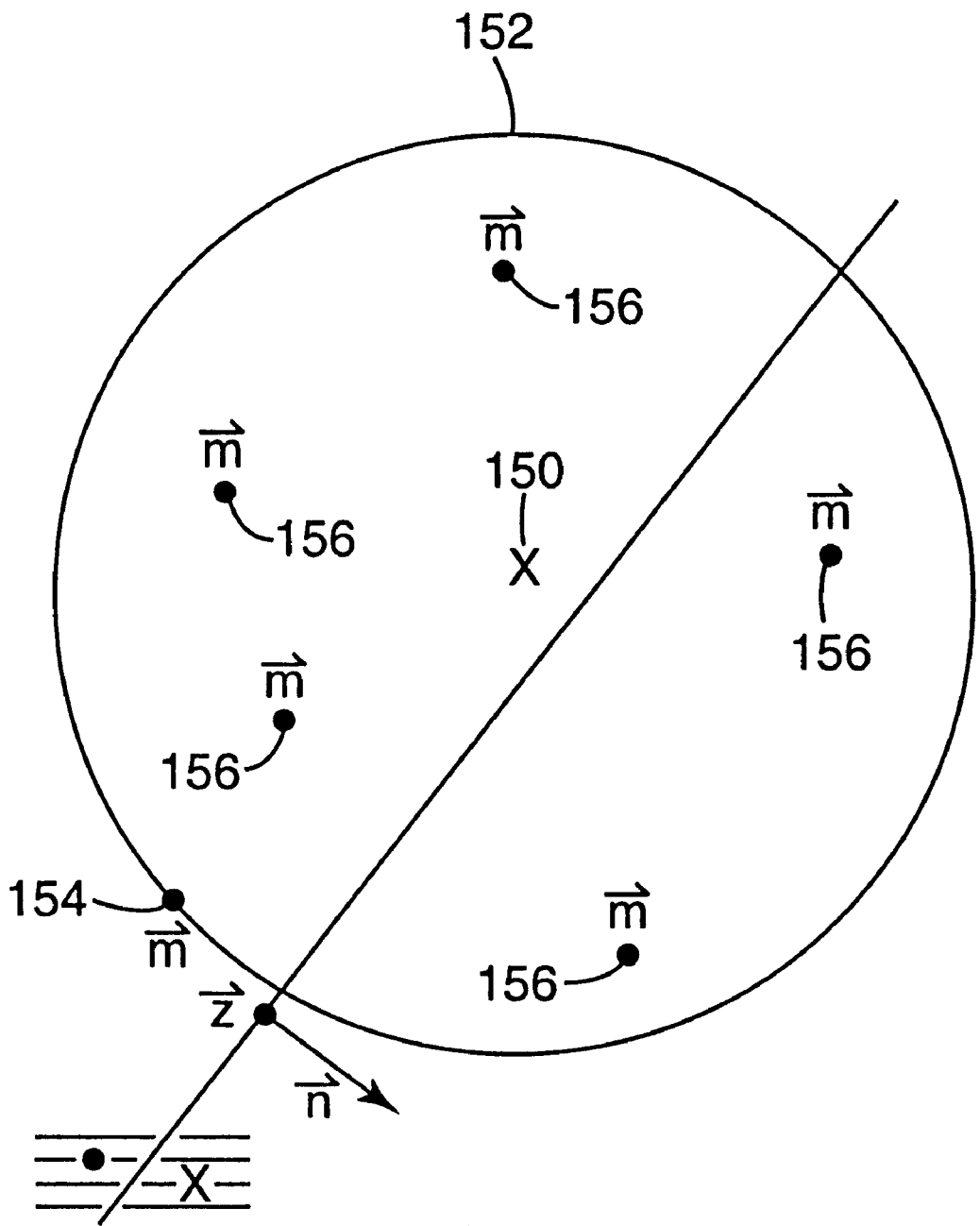
FIG. 9 is used to describe the determination of a proxy post for a sample point.

While each sample has its own post, proxy posts are identified for each sample. A proxy post is the most popular candidate post, which may be the post of the sample or the post of a different sample, within a proxy ball that correctly classifies the sample in question. Referring to FIG. 9, proxies must be identified for sample point 150. Post midpoints m for sample points are examined to determine if they correctly classify sample point 150. Once a post midpoint misclassifies sample point 150, proxy ball 152 is drawn around sample point 150 with its radius equal to the distance between sample 150 and misclassifying post midpoint 154. In FIG. 9, sample point 150 has five potential proxies 156 within proxy ball 152 that correctly classifies it. Next, each potential proxy 156 is compared with the other potential proxies to determine which potential proxy is the most popular. While all post midpoints within proxy ball 152 correctly classify sample point 150, the potential proxy with the highest popularity is designated as the proxy of sample point 150.

After each sample point has a proxy, all candidate posts that are not proxies for some sample point are eliminated from competing to be included in the final post set. If any candidate posts are removed, proxies are again identified for each sample point from the candidate posts remaining in competition to be included in the final post set. This process continues until there is an iteration where no candidate posts are eliminated from the proxy list. The final post set has thus been determined, each post in the post set represented by the set of three vectors {m, z, n}. The final post set determines the number of nodes necessary for the facet classification neural network, as will next be described, and are used to define the synaptic weights of the neural network.

Figure 10:
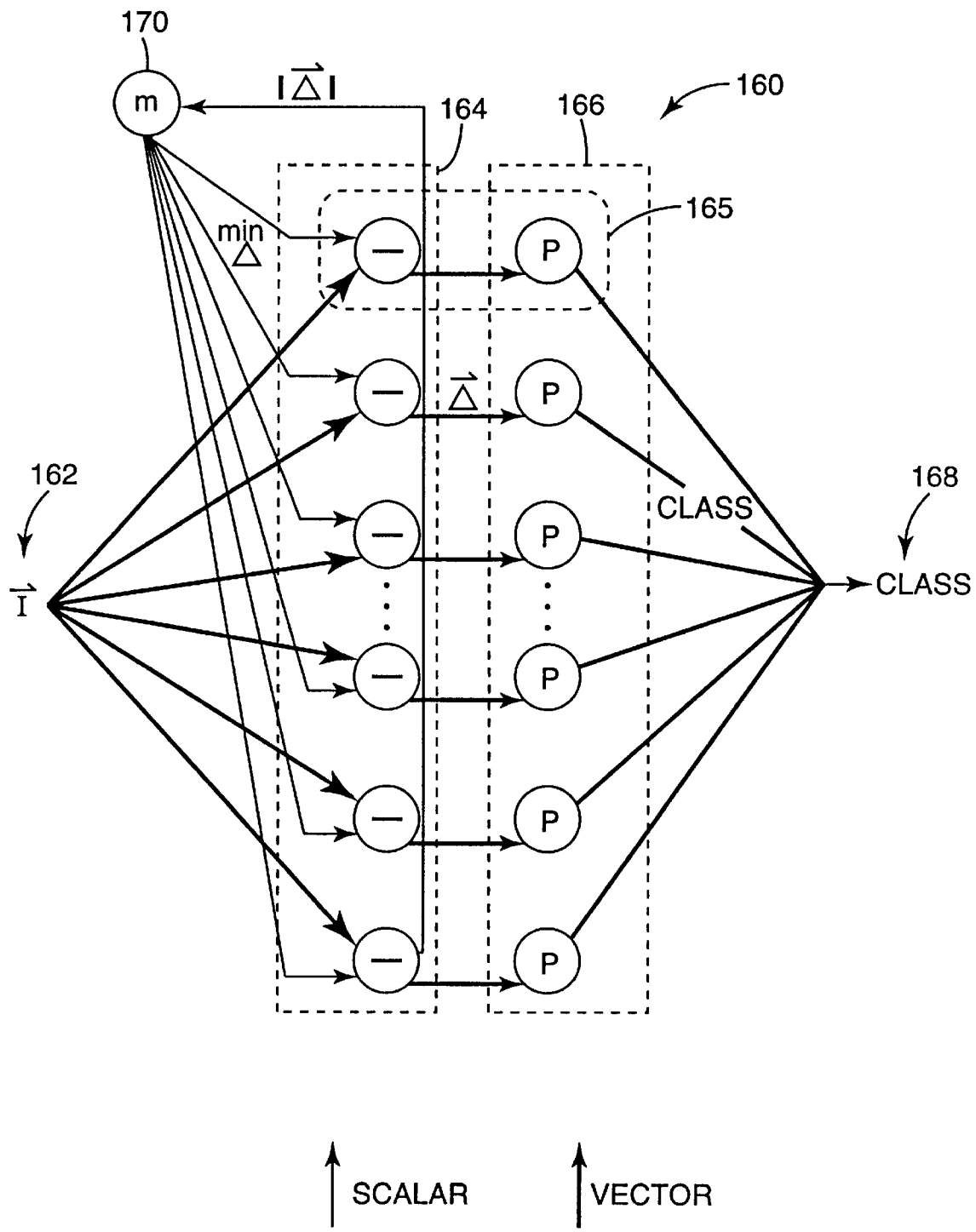
FIG. 10 shows a first embodiment of the architecture of the neural network of the present invention.

Referring to FIG. 10, the architecture of the facet classification neural network of the present invention will now be described. In this embodiment of the present invention, the final post set includes a pair of vectors, the post midpoint m and the post normal n. Facet classification neural network 160 is a multilayered neural network, having input layer 162, two layers of nodes, namely, difference nodes 164 and perceptron nodes 166, and output layer 168. Post 165 is represented in the network 160 by difference node 164 and perceptron node 166. Input layer 162 receives n-dimensional input vectors representing information to be classified by neural network 160. Difference nodes 164 are nodes found in the domain layer of neural network 160. The number of difference nodes is determined during the learning phase and corresponds to the number of posts in the final post set. The function of difference nodes 164 is to partition the input space by defining the domain of each linear separation, or each facet. In one embodiment, difference nodes 164 also can transform the input vector to the localized domain defined by difference nodes 164. Difference nodes 164 first compute a nearest neighbor function for the post midpoints m, as opposed to for the sample points, as prior art type nearest neighbor neighbor classifiers did. This piecewise linear separation creates vornoi cells defined by post midpoints m from the final post set, with partitioning hypersurfaces, defined by the perceptron nodes, within some or all of the vornoi cells. Each difference node is electrically interconnected to input layer 162 and also minimum node 170. Each difference node takes two inputs and holds a vector in memory. The vector held in memory is the post midpoint m determined from the learning set. One input is the input vector to be classified, and comes from input layer 162. The other input is the output of minimum node 170. Each difference node transmits the magnitude of its input vector and the vector it holds in memory to minimum node 170. Each difference node can also transmit the difference vector itself. Minimum node 170 identifies a transforming difference node from difference nodes 170. The transforming difference node is the difference node defining the vornoi cell in which the input vector to be classified lies.

Perceptron layer 166 comprises a plurality of perceptrons, each perceptron assigned to a particular domain. The number of perceptrons in the perceptron layer is determined by the number of posts set up during the learning phase, and corresponds to the number of difference nodes present in the domain layer of the network. Each perceptron takes as its input the difference vector output from its corresponding difference node. Each perceptron uses the components of a post normal vector n as its synaptic weights. The threshold of the perceptrons are set to zero. Each perceptron then produces a scalar identifying the classification of the difference vector. Output layer 168 receives the scalar identifying the classification from perceptron nodes 166 and outputs a class designator for the input vector.

Figure 11:
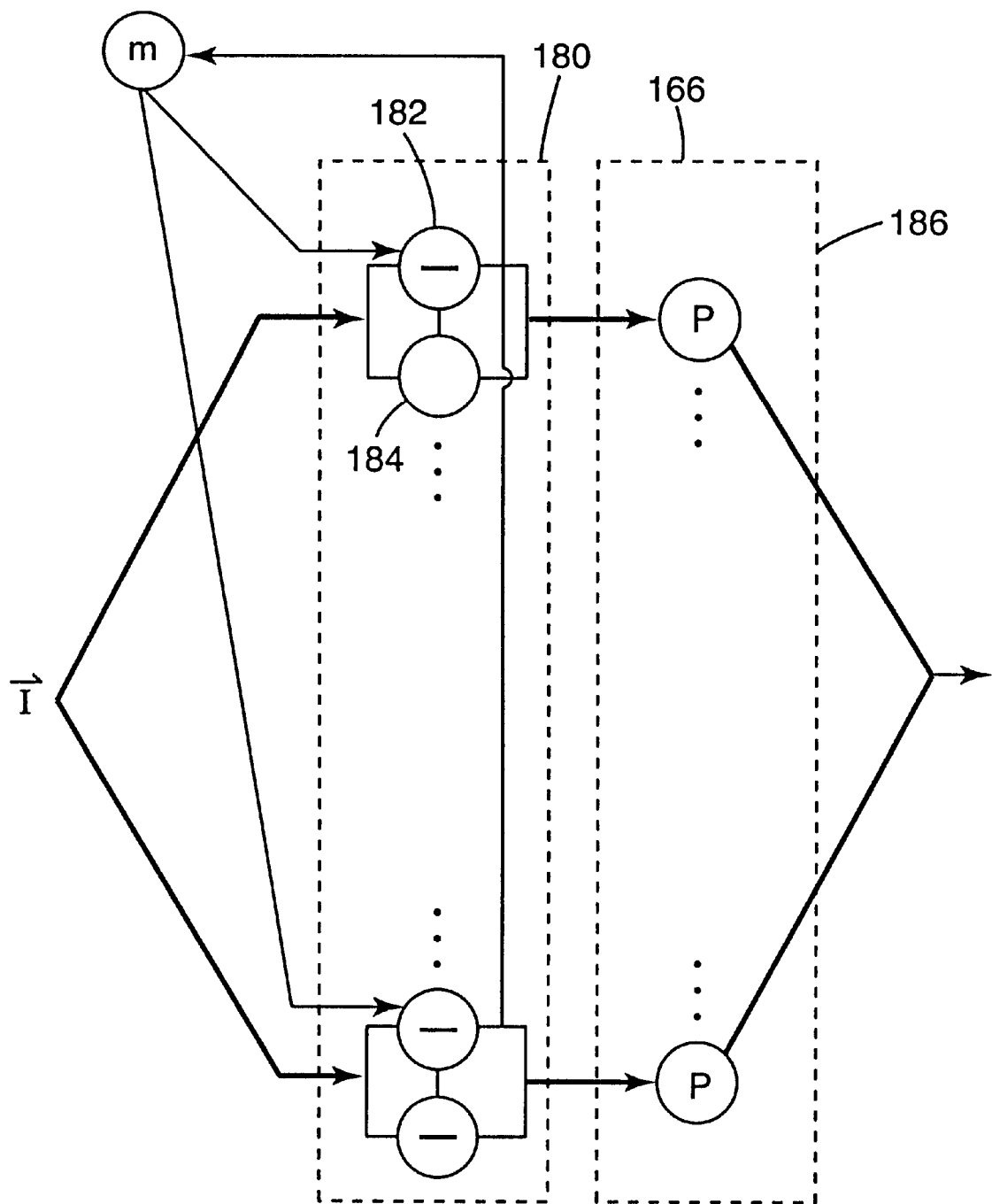
FIG. 11 shows a second embodiment of the architecture of the neural network of the present invention.

In a preferred embodiment of the present invention, as shown in FIG. 11, domain layer 180 is a heterogeneous layer, which includes pairs of nodes, in contrast to only a difference node as in FIG. 10. The architecture of the facet classification neural network in FIG. 11 corresponds to an architecture where the final set of posts includes three vectors, the post midpoint m, the post normal n, and the facet origin z. Difference node 182 corresponds with the difference nodes in FIG. 10, and stores the components of post midpoint vector m as synaptic input weights for difference node 182. Similarly, perceptrons in perceptron layer 186 correspond to the perceptron layer in FIG. 10 and use the components of post normal vector n as its synaptic weights. In domain layer 180, however, a second node type is paired with each difference node 182. Adjusted difference node 184 receives as inputs the input vector to be classified as well as a signal from difference node 182 when adjusted difference node should output a vector. Adjusted difference node 184 uses the components of facet origin vector z as its synaptic weights. Those skilled in the art will readily recognize that a single difference node could perform the functions of both difference node 182 and adjusted difference node 184, as shown as combined node 183.

The operation of the preferred embodiment of the present invention, as shown in FIG. 11, will now be described. Generally, all posts, the corresponding nodes from the two middle layers, compete amongst themselves to classify an input vector. Each difference node defines a localized domain within the input space, the localized domain represented by a vornoi cell. The vornoi cell is a polytope with bounded hypersurfaces that are a set of points equidistant from any of the generators of the cells, the midpoints m associated with a particular difference node. If the input vector lies within the vornoi cell associated with a difference vector, that difference vector is a transforming difference node which transforms the input vector to a localized domain. The transforming difference node's corresponding perceptron classifies the input. Thus, the difference nodes transform the input vector into a local coordinate space defined by the winning post's midpoint vector m and the perceptron nodes perform the classification.

An input vector I is received at the input layer and broadcast to each difference node and each adjusted difference node. Each difference node computes the vector difference:

$$\Delta V = I - m$$

which is the difference between the post midpoint m in the difference node's memory and the input vector I. Then, each difference node computes the magnitude of $\Delta V$, that is:

$$|\Delta V| = |I - m|$$

and all difference nodes send their corresponding $|\Delta V|$ to the minimum node. Similarly, each adjusted difference node computes the vector:

$$\Delta W = I - z$$

The minimum node compares the magnitude $|\Delta V|$ sent from all the difference nodes and determines the minimum. The value of the minimum magnitude is broadcast back to the difference nodes. Each difference node compares the value broadcast from the minimum node with its output, $|\Delta V|$. If the value broadcast from the minimum node matches the output value, then the difference node, a transforming difference node, stimulates its corresponding adjusted difference node to transmit $\Delta W$. If the difference node's reply from the minimum node does not match, the difference node has no output.

The transforming difference node produces output $\Delta W$ and transmits it to its corresponding perceptron, which produces a class designation according to the sign of $\Delta W \cdot n$, where n is the post normal and whose components constitute the synaptic weights of the perceptron. Since the threshold is set to zero in this embodiment, because z is located directly at the origin of the partitioning hyperplane, the sign of the dot product will determine in which class the input falls. The output of the facet classification neural network can be a binary output, output={0, 1}, or it could be a range of values, output={0, 1, 2, 3, . . . , n}. Each perceptron produces a class designator having one of two values assigned to the perceptron. For example, when a network has a binary output, a perceptron's class designator will have a value of 1 or 0. On the other hand, when the desired output is a range of values, the two values associated with the class designator for each perceptron will be different for each perceptron. For example, if the network's output is a range of values between 0 and 5, a first perceptron might produce an output of a class designator associated with the values 2 and 4. A second perceptron might produce an output of a class designator associated with the values of 1 and 5 and a third perceptron might produce an output of a class designator associated with the values of 0 and 3. Thus, while each perceptron relates to two classes, the entire network can produce a plurality of classifications and relate to an arbitrarily large number of classes.

Figure 12:
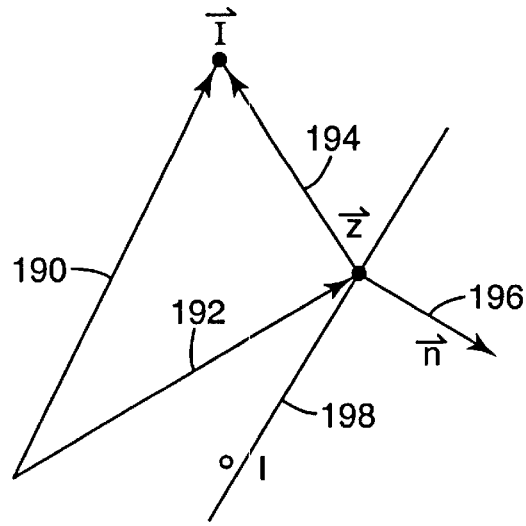
FIG. 12 shows the relationship of the vectors used in operation of the neural network.

For example, referring to FIG. 12, input vector I 190 is shown. Input vector I 190 is compared with each midpoint m, not shown, to determine with which midpoint m input vector I 190 is closest. This function is performed in the difference nodes of the neural network and the minimum node. Once the nearest midpoint m is determined, the input vector is transformed into a local coordinate space, or domain, defined by midpoint m. Then, facet origin z 192 corresponding to the midpoint m closest to input vector I 190 is subtracted from input vector I 190 at the adjusted difference node. The resulting vector, $\Delta W$ 194 is sent to the transforming difference node's corresponding perceptron. When the dot product of $\Delta W$ is taken with n 196, the result will be negative, thereby indicating that input vector I 190 falls on the zero side of partitioning hyperplane 198. In this case, the perceptron would output a class designator indicating that input vector I was in a class represented by the value zero.

Figure 13:
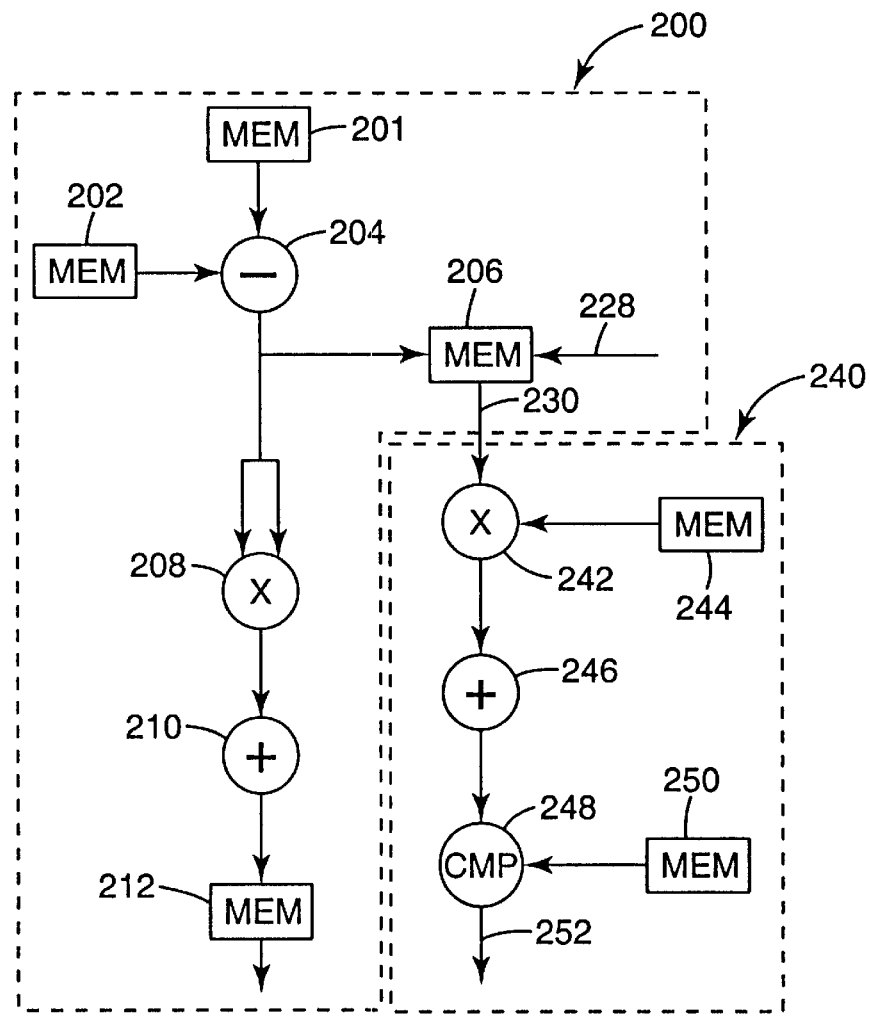
FIGS. 13 and 14 show a hardware implementation of the architecture of the present invention.
Figure 14:
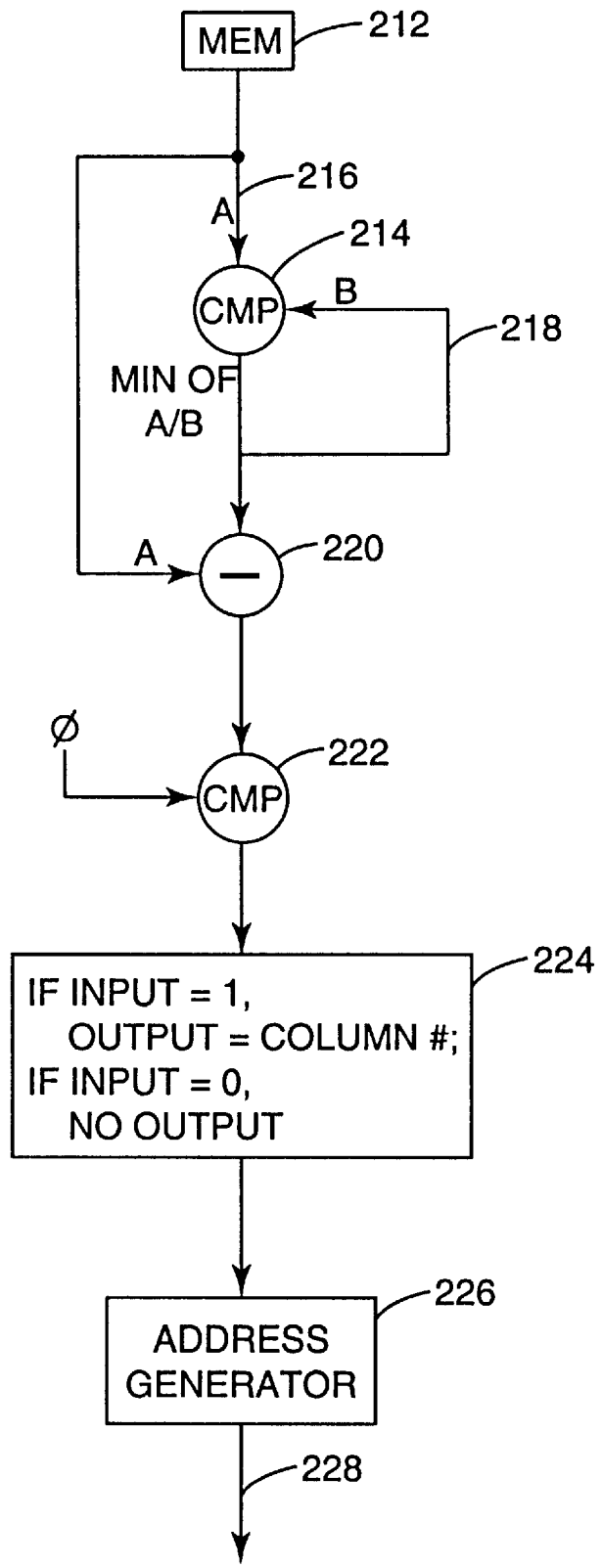

Referring to FIGS. 13–14, a hardware implementation of an embodiment of the present invention with posts having two vectors, the post midpoint m and the post normal n, will now be described. Referring to FIG. 13, block 200 is a schematic diagram of an input node and difference nodes. Memory 201 receives an N×1 array representing an N-dimensional input pattern, I. Each component to the N-dimensional input pattern is represented, in one embodiment of the invention, by a 16-bit value. The N×1 array is duplicated M times to form a N×M matrix, the matrix holding the N×1 input array in each of the M columns. Memory 202 stores an N×M difference node synaptic weight matrix. The N rows of the matrix correspond to the N-dimensions of the input vector. The M columns of the matrix correspond to the M difference nodes in the first layer of the neural network. The 16-bit values located in each memory location of the array representing the synaptic weight matrix are precalculated weights derived from the training set. Specifically, the weights in each column are the components of the post midpoint m. At adder 204, the difference node synaptic weight matrix from memory 202 is subtracted from the duplicated input vector matrix from memory 201. This function finds the localized coordinate space of the input vector I, by determining I−m at the difference node. After the subtraction has occurred for each difference node, the array representing each difference vector from each node is stored in memory 206.

Each difference node next determines the ordering of the magnitudes of the difference vectors, |I−m|. The output from adder 204, the difference vectors from each difference node, is input into both inputs of multiplier 208. Thus, the array representing each difference vector is multiplied by itself, thereby squaring each of the N components of the vector. The squared components of the N-dimensional difference vector are then added at adder 210. The result is a column summation and facilitates determining the ordering of the magnitudes of the vectors. To actually compute the magnitude of each vector, the square root of the sum of squares could be computed. As described in the operation of the neural network, only identifying the difference vector with the minimum magnitude is necessary. Since the difference vector with the minimum magnitude will also have the minimum of the squared magnitudes, the square root function need not be performed because the ordering remains the same. The sum of the squared components of the difference vectors are then stored in memory 212.

Referring to FIG. 14, a schematic diagram of a hardware implementation of the minimum node will be described. Memory 212 sends the sum of the squared components to comparator 214 through input A 216 of comparator 214. The sum of the squared components of each N-dimensional difference vector are serially sent to comparator 214. The output of comparator 214 at time t=0 is the value of the input. In other words, the first input value is passed through comparator 214 and is output from comparator 214. The output of comparator 214 is fedback to its B input 218. The output of comparator 214 is also sent to one input of adder 220. After the first input, comparator 214 determines the minimum value of input A 216 and input B 218 and outputs the minimum value.

Adder 220 subtracts the value of the sum of the squared components of the difference vector that was also sent to input A 216 of comparator 214 from the output of comparator 214. The output of adder 220 is the minimum of input A 216 and input B 218 less input A 216, or:

Adder output=min(input A, input B)−input A

The output of adder 220 is sent to comparator 222, which compares the output of adder 220 with zero. If the output of adder 220 is equal to zero, then comparator 222 transmits the value of one. This occurs when the value from input A is the new minimum. If the output of adder 220 is less than zero, then comparator 222 transmits the value of zero. This occurs when the value from input A is greater than the value from input B such that the value from input B 218 is still the minimum. The output of adder 220 will not be greater than zero. The output of comparator 222 is sent to decision module 224, which transmits the address of the column number of the difference vector if the output of comparator 222 is a one, and which has no output if the input is zero. The column number is the column from the N×M matrix with a minimum sum of squares at the time the value was input into comparator 214 and represents the location of the difference vector with the minimum magnitude. Address generator 226 receives an address of a column from decision module 224 each time comparator 222 produces an output of one and keeps track of the highest received address. After all M difference vectors have sent their sum of squares to comparator 214, address generator 226 sends the highest received column address to all memories holding difference vectors through output 228. The memory at the highest column address holds the minimum value of the sum of squares of the components of the difference vector and thus the difference vector with the minimum magnitude. In an embodiment where the sum of squares is stored in the address location following the address locations storing the components of a difference vector, the string of N addresses before the highest column address will be the difference vector with the minimum magnitude. Referring back to FIG. 13, memories 206 and 244 receive the address sent out by address generator 226. Memory 206 releases the difference vector associated with the received address through output 230.

In FIG. 13, block 240 represents the perceptron layer and the output node of the neural network of the present invention. Each perceptron will distinguish between two classes and output a class designator relating to one of the two classes. Memory 244 stores an array representing an N×M perceptron synaptic weight matrix. The weights for the perceptron synaptic weight matrix are derived from the components of the post normal n. Multiplier 242 multiplies the difference vector received from output 230 with the column from the synaptic weight matrix corresponding to the difference vector. This column is determined by the address received by address generator 226. After all components of the difference vector have been multiplied by their correct synaptic weights, they are added together at adder 246. Multiplier 242 and adder 246 thus take the dot product of the difference vector with the synaptic weight vector. The output of adder 246 is a single number. Comparator 248 compares the output of adder 246 with the threshold, a predefined value stored in memory 250. Each perceptron can have a different threshold, the threshold value in memory 250 being a precalculated number corresponding to a particular classification. In this embodiment of the present invention, the threshold value is set to zero, because the of the location of the origin of the partitioning hyperplane. If the output of adder 246 is greater than or equal to the threshold for the perceptron, then comparator 248 outputs a one. If the output of adder 246 is less than the threshold, then comparator 248 outputs a zero. Decision module 254 receives the output of comparator 248. If decision module 254 receives a one, it outputs a first class designator for the two classes associated with the perceptron. If decision module 254 receives a zero, it outputs a second class designator for the classes associated with the perceptron. In the perceptron layer, all perceptrons need not have the same two classes associated with them. Thus, the entire perceptron layer can classify an arbitrarily large number of classes.

Although a preferred embodiment has been illustrated and described for the present invention, it will be appreciated by those of ordinary skill in the art that any method or apparatus which is calculated to achieve this same purpose may be substituted for the specific configurations and steps shown. It is intended that this covers any adaptations or variations of the present invention. Therefore, it is manifestly intended that this invention be limited only by the appended claims and the equivalents thereof.

What is claimed is:

1. A classification neural network for classifying input patterns, said classification neural network comprising:

an input node for receiving said input patterns;

a plurality of nodes connected to said input node for transforming said input patterns to localized domains defined by each node;

a minimum node connected to said plurality of nodes for identifying a transforming node from said plurality of nodes;

a plurality of perceptron nodes, each said perceptron node connected to a corresponding node from said plurality of nodes for producing class designators, wherein said transforming node transmits a signal to its corresponding perceptron node for producing a class designator; and an output node connected to said plurality of perceptron nodes for receiving said class designators from said plurality of perceptron nodes.

2. The classification neural network according to claim 1, wherein each said node comprises:

memory means for storing a reference vector;

processing means for computing a vector, determining a magnitude of said vector and comparing said magnitude with magnitude values received from said minimum node.

3. The classification neural network according to claim 2, wherein said minimum node identifies said transforming node by receiving said magnitudes of said vectors from said nodes, determining a minimum magnitude from among said magnitudes, and sending said minimum magnitude to said nodes.

4. The classification neural network according to claim 2, wherein said memory means stores a first reference vector and a second reference vector and wherein the difference between said input pattern and said first reference vector comprises said vector.

5. The classification neural network according to claim 4, wherein said transforming node sends a partitioning hypersurface origin vector to its corresponding perceptron node, said partitioning hypersurface origin vector being the difference between said input pattern and said second reference vector.

6. The classification neural network according to claim 2, wherein said nodes transform said input pattern to localized domains by creating vornoi cells defined by said reference vector stored in each said node.

7. The classification neural network according to claim 1, wherein said minimum node identifies said transforming node by identifying in which localized domain said input pattern lies.

8. The classification neural network according to claim 1, wherein said perceptron node corresponding with said transforming node classifies said input pattern.

9. The classification neural network according to claim 3, wherein said transforming node receives said minimum magnitude value from said minimum node, compares said received minimum magnitude value with said magnitude of said vector and sends said vector to its corresponding perceptron node which classifies said input pattern.

10. The classification neural network according to claim 1, wherein said nodes transform said input pattern to localized domains by determining in which vornoi cells defined by each said node said input pattern lies.

11. The classification neural network according to claim 10, wherein said perceptron nodes produce class designators by determining on which side of partitioning hypersurfaces within said vornoi cell said input pattern lies.

12. The classification neural network according to claim 1, wherein said nodes further comprise node synaptic weight memory means for storing node synaptic weights and wherein said perceptron nodes further comprise perceptron node synaptic weight memory means for storing perceptron node synaptic weights.

13. The classification neural network according to claim 12, further comprising:
   means for acquiring a plurality of sample points and correct classifications of said sample points;
   means for establishing a candidate post for each said sample point, said candidate post comprising said sample point, a nearest neighbor of opposite type for said sample point, a midpoint vector and a normal vector;
   means for adjusting each said midpoint vector to correctly classify a set of said sample points that may be classified by said candidate post associated with said midpoint vector;
   means for pruning the size of said network to establish a final post set; and
   means for assigning components of each said midpoint vector from said final post set as synaptic weights for a corresponding node and components of each said normal vector from said final post set as synaptic weights for a corresponding perceptron node.

14. The classification neural network according to claim 13, wherein said set of sample points that may be classified by said candidate post comprises a set of sample points that are classified by said candidate post associated with said midpoint vector rather than the candidate post associated with said sample points.

15. The classification neural network according to claim 14, wherein said means for adjusting each said midpoint vector comprises:

means for defining a sphere centered at one-third the distance from said sample point to its nearest neighbor of opposite type and located therebetween, said sphere having a radius of a distance from its center to said sample point;
   means for projecting misclassified sample points within said sphere onto a line running between said sample point and said nearest neighbor of opposite type; and
   means for moving said midpoint vector to the midpoint between the most peripherally projected misclassified sample point within said sphere and said nearest neighbor of opposite type of said sample point.

16. The classification neural network according to claim 13, wherein said set of sample points that may be classified by said candidate post comprises a set of sample points that are classified by said candidate post associated with said midpoint vector rather than the candidate post associated with said sample points and are incorrectly classifed by said candidate post associated with said midpoint vector.

17. The classification neural network according to claim 13, wherein said set of sample points that may be classified by said candidate post comprises a set of sample points that are closer to said sample point of said candidate post than said nearest neighbor of opposite type.

18. The classification neural network according to claim 17, wherein said means for adjusting each said midpoint vector comprises:

means for defining a first sphere centered around said sample point, a radius of said first sphere being a distance from said sample point to its nearest neighbor of opposite type;
   means for defining a second sphere centered at said nearest neighbor of opposite type of said sample point, said second sphere having a radius of a distance from its center to its nearest neighbor of opposite type;
   means for identifying a third sphere from said first sphere and said second sphere, said third sphere having only one class of sample points within its boundaries;
   means for projecting misclassified sample points within said third sphere onto a partitioning hypersurface originating at said midpoint vector; and
   means for moving said midpoint vector to the midpoint between the most peripherally projected misclassified sample point and said nearest neighbor of opposite type of said sample point.

19. The classification neural network according to claim 13, wherein said means for pruning the size of the network comprises:

means for defining a popularity sphere centered at each said post midpoint, said popularity sphere having a popularity sphere radius equal to a distance from said post midpoint to a first sample point misclassified by said post midpoint;
   means for counting the number of correctly classified sample points within said popularity sphere;
   means for defining a proxy sphere centered at each said sample point, said proxy sphere having a proxy sphere radius equal to a distance from said sample point to a first post midpoint that misclassifies said sample point;
   means for identifying a proxy post for each said sample point, said proxy post being a candidate post within said proxy sphere of said sample point with the highest number of correctly classified sample points within its popularity sphere;
   means for eliminating candidate posts that are not proxy posts; and means for determining whether no said candidate posts are eliminated.

20. The classification neural network according to claim 1, wherein said plurality of nodes comprise:
first memory means for storing first weight factors;
first adder means for subtracting said first weight factors from said input pattern to produce vectors;
second memory means for storing said vectors;
multiplier means for squaring components of said vectors; and
second adder means for adding said squared components of said vectors to produce squared vector magnitudes.

21. The classification neural network according to claim 1, wherein said minimum node comprises:
memory means for storing squared vector magnitudes;
first comparator means for determining a minimum of a first input and a second input of said first comparator means, said first input connected to said memory means and an output of said first comparator means connected to said second input;
adder means for subtracting said vector magnitudes from said minimum of said first input and said second input;
second comparator means for determining if said squared vector magnitude is a minimum magnitude;
decision module for outputting an address location of said minimum magnitudes; and
an address generator for outputting a maximum address location of received addresses.

22. The classification neural network according to claim 1, wherein said perceptron nodes comprise:
first memory means for storing first weight factors;
multiplier means for multiplying a vector with said first weight factors to produce weighted vector components;
adder means for adding said weighted vector components;
second memory means for storing a threshold value;
comparator means for comparing said sum of weighted vector components with said threshold value and outputting a first class designator if said sum of weighted vector components is greater than or equal to said threshold value and outputting a second class designator if said sum of weighted vector components is less than said threshold value.

23. A classification neural network for classifying input patterns, said classification neural network comprising:
an input node for receiving said input patterns;
a plurality of first nodes connected to said input node for determining in which localized domain defined by each node each said input pattern lies;
a plurality of second nodes connected to a corresponding first node from said plurality of first nodes for localizing each said input pattern to said domain defined by its corresponding first node;
a minimum node connected to said plurality of first nodes for identifying a transforming first node from said plurality of first nodes;
a plurality of perceptron nodes, each said perceptron node connected to a corresponding second node from said plurality of second nodes for producing class designators; and
an output node connected to said plurality of perceptron nodes for receiving said class designators from said plurality of perceptron nodes.

24. The classification neural network according to claim 23, wherein said plurality of first nodes further comprises:
memory means for storing a first reference vector; and
processing means for computing a vector, determining a magnitude of said vector, and comparing said magnitude with magnitude values received from said minimum node.

25. The classification neural network according to claim 24, wherein said plurality of second nodes further comprises:
memory means for storing a second reference vector; and
processing means for computing a partitioning hypersurface origin vector.

26. The classification neural network according to claim 23, wherein said perceptron node corresponding with said transforming first node classifies said input pattern.

27. The classification neural network according to claim 23, wherein said transforming first node instructs its corresponding second node to send a localized input pattern vector to its corresponding perceptron node which classifies said input pattern.

28. The classification neural network according to claim 23, wherein said first nodes transform said input pattern to localized domains by determining in which vornoi cells defined by each said first node said input pattern lies.

29. The classification neural network according to claim 23, wherein said perceptron nodes produce class designators by determining on which side of partitioning hypersurfaces defined by said second nodes within said vornoi cell said input pattern lies.

30. The classification neural network according to claim 23, wherein said first nodes transform said input pattern to localized domains by creating vornoi cells defined by a reference vector stored in each said first node.

31. The classification neural network according to claim 23, wherein said first nodes further comprise first node synaptic weight memory means for storing first node synaptic weights, said second nodes further comprise second node synaptic weight memory means for storing second node synaptic weights and wherein said perceptron nodes further comprises perceptron node synaptic weight memory means for storing perceptron node synaptic weights.

32. The classification neural network according to claim 31, further comprising:
means for acquiring a plurality of sample points and correct classifications of said sample points;
means for establishing a candidate post for each said sample point, said candidate post comprising said sample point, a nearest neighbor of opposite type for said sample point, a midpoint vector, a normal vector and a partitioning hyperplane origin vector;
means for adjusting each said hyperplane origin vector to correctly classify a set of said sample points that may be classified by said candidate post associated with said midpoint vector;
means for pruning the size of said network to establish a final post set; and
means for assigning components of each said midpoint vector from said final post set as synaptic weights for a corresponding first node, components of each said partitioning hyperplane origin vector from said final post set as synaptic weights for a corresponding second node and components of each said normal vector from said final post set as synaptic weights for a corresponding perceptron node.

33. The classification neural network according to claim 32, wherein said set of sample points that may be classified by said candidate post comprises a set of sample points that are classified by said candidate post associated with said midpoint vector rather than the candidate post associated with said sample points.

34. The classification neural network according to claim 33, wherein said means for adjusting each said partitioning hyperplane vector comprises:

means for defining a sphere centered at one-third the distance from said sample point to its nearest neighbor of opposite type and located therebetween, said sphere having a radius of a distance from its center to said sample point;

means for projecting misclassified sample points within said sphere onto a line running between said sample point and said nearest neighbor of opposite type; and means for moving said partitioning hyperplane vector to the midpoint between the most peripherally projected misclassified sample point within said sphere and said nearest neighbor of opposite type of said sample point.

35. The classification neural network according to claim 32, wherein said set of sample points that may be classified by said candidate post comprises a set of sample points that are classified by said candidate post associated with said midpoint vector rather than the candidate post associated with said sample points and are incorrectly classifed by said candidate post associated with said midpoint vector.

36. The classification neural network according to claim 32, wherein said set of sample points that may be classified by said candidate post comprises a set of sample points that are closer to said sample point of said candidate post than said nearest neighbor of opposite type.

37. The classification neural network according to claim 32, wherein said means for adjusting each said partitioning hyperplane origin vector comprises:

means for defining a first sphere centered around said sample point, a radius of said first sphere being a distance from said sample point to its nearest neighbor of opposite type;

means for defining a second sphere centered at said nearest neighbor of opposite type of said sample point, said second sphere having a radius of a distance from its center to its nearest neighbor of opposite type;

means for identifying a third sphere from said first sphere and said second sphere, said third sphere having only one class of sample points within its boundaries;

means for projecting misclassified sample points within said third sphere onto a partitioning hypersurface originating at said midpoint vector; and means for moving said partitioning hyperplane origin vector to the midpoint between the most peripherally projected misclassified sample point and said nearest neighbor of opposite type of said sample point.

38. The classification neural network according to claim 32, wherein said means for pruning the size of the network comprises:

means for defining a popularity sphere centered at each said post midpoint, said popularity sphere having a popularity sphere radius equal to a distance from said post midpoint to a first sample point misclassified by said post midpoint;

means for counting the number of correctly classified sample points within said popularity sphere;

means for defining a proxy sphere centered at each said sample point, said proxy sphere having a proxy sphere radius equal to a distance from said sample point to a first post midpoint that misclassifies said sample point;

means for identifying a proxy post for each said sample point, said proxy post being a candidate post within said proxy sphere of said sample point with the highest number of correctly classified sample points within its popularity sphere;

means for eliminating candidate posts that are not proxy posts; and means for determining whether no said candidate posts are eliminated.

39. A method of classifying an input pattern in a neural network system, said system comprising a plurality of difference nodes for transforming said input pattern to localized domains defined by each difference node, a plurality of perceptron nodes, each said perceptron node connected to a corresponding difference node from said plurality of difference nodes and an output node connected to said plurality of perceptron nodes, said method comprising the steps of:

a) broadcasting said input pattern to said plurality of difference nodes;

b) computing a difference between said input pattern and a reference vector at each said difference node, said difference being a difference vector;

c) identifying a transforming difference node from among said plurality of difference nodes, said transforming difference node representing a localized domain in which said input pattern lies;

d) sending a localized vector from said transforming difference node to a corresponding perceptron node from said plurality of perceptron nodes; and e) producing a class designator from said localized vector at said corresponding perceptron node.

40. The method of classifying an input pattern in a neural network system according to claim 39, said neural network further comprising a minimum node connected to said difference nodes, wherein said step of identifying said transforming difference node comprises the steps of:

a) computing a magnitude of each said difference vector at each said difference node;

b) sending said magnitude of each said difference vector to said minimum node;

c) determining a minimum magnitude of each said magnitudes of said difference vectors at said minimum node;

d) broadcasting said said minimum magnitude to said plurality of difference nodes;

e) comparing said magnitude of each said difference vector with said minimum magnitude; and f) designating said difference node with said magnitude of said difference vector matching said minimum magnitude as said transforming difference node.

41. The method of classifying an input pattern in a neural network system according to claim 39, wherein said localized vector is said difference vector.

42. The method of classifying an input pattern in a neural network system according to claim 39, further comprising the step of computing a second difference vector between said input pattern and a second reference vector at each said difference node, said difference being a partitioning hypersurface origin vector.

43. The method of classifying an input pattern in a neural network system according to claim 39, wherein said localized vector is said partitioning hypersurface origin vector.

44. A method of classifying an input pattern in a neural network system, said system comprising a plurality of nodes for transforming said input pattern to localized domains defined by each node, and a plurality of perceptron nodes, each said perceptron node connected to a corresponding node from said plurality of nodes, said method comprising the steps of:

a) defining vornoi cells as said localized domains for said nodes;

b) determining in which vornoi cell said input pattern lies;

c) transforming said input pattern to said localized domain of said vornoi cell in which said input pattern lies; and d) classifying said localized input pattern at said perceptron node corresponding to said node.

45. The method of classifying an input pattern in a neural network system according to claim 44, wherein determining in which vornoi cell said input pattern lies comprises determining a minimum distance between a vornoi cell generator and said input pattern, said input pattern lying within said vornoi cell generated by said vornoi cell generator.

46. The method of classifying an input pattern in a neural network system according to claim 44, wherein said network further comprises a minimum node and wherein determining in which vornoi cell said input pattern lies comprises computing a vector, said vector being a difference between said input pattern and a first reference vector stored in said node, determining the magnitude of said vector and comparing said magnitude with values received from said minimum node.

47. The method of classifying an input pattern in a neural network system according to claim 44, wherein transforming said input pattern to said localized domain comprises computing a localized vector, said localized vector being a difference between said input pattern and a second reference vector stored in said node.

48. The method of classifying an input pattern in a neural network system according to claim 44, wherein classifying said localized input pattern comprises determining on which side of a partitioning hyperplane said localized input pattern lies.

49. A method of producing weight factors and modifying a size of a neural network, said neural network comprising a plurality of nodes for transforming said input pattern to localized domains defined by each node, a plurality of perceptron nodes, each said perceptron node connected to a corresponding node from said plurality of nodes and an output node connected to said plurality of perceptron nodes, said method comprising the steps of:

a) acquiring a plurality of sample points and correct classifications of said sample points;

b) establishing a candidate post for each said sample point, said candidate post comprising said sample point, a nearest neighbor of opposite type for said sample point, a midpoint vector and a normal vector;

c) adjusting each said midpoint vector to correctly classify a set of said sample points that may be classified by said candidate post associated with said midpoint vector;

d) pruning the size of said network to establish a final post set; and e) assigning components of each said midpoint vector from said final post set as synaptic weights for a corresponding node and components of each said normal vector from said final post set as synaptic weights for a corresponding perceptron node.

50. The method according to claim 49, wherein said set of sample points that may be classified by said candidate post comprises a set of sample points that are classified by said candidate post associated with said midpoint vector rather than the candidate post associated with said sample points.

51. The method according to claim 49, wherein said set of sample points that may be classified by said candidate post comprises a set of sample points that are classified by said candidate post associated with said midpoint vector rather than the candidate post associated with said sample points and are incorrectly classifed by said candidate post associated with said midpoint vector.

52. The method according to claim 49, wherein said set of sample points that may be classified by said candidate post comprises a set of sample points that are closer to said sample point of said candidate post than said nearest neighbor of opposite type.

53. The method according to claim 49, wherein pruning the size of the network comprises the steps of:

a) defining a popularity sphere centered at each said post midpoint, said popularity sphere having a popularity sphere radius equal to a distance from said post midpoint to a first sample point misclassified by said post midpoint;

b) counting the number of correctly classified sample points within said poplularity sphere;

c) defining a proxy sphere centered at each said sample point, said proxy sphere having a proxy sphere radius equal to a distance from said sample point to a first post midpoint that misclassifies said sample point;

d) identifying a proxy post for each said sample point, said proxy post being a candidate post within said proxy sphere of said sample point with the highest number of correctly classified sample points within its popularity sphere;

e) eliminating candidate posts that are not proxy posts; and f) repeating steps a) through e) until no said candidate posts are eliminated.

* * * * *